(12) United States Patent
Gu et al.

(10) Patent No.: US 11,405,503 B2
(45) Date of Patent: Aug. 2, 2022

(54) TRANSLATION METHOD AND ELECTRONIC DEVICE

(71) Applicant: Huawei Technologies Co., Ltd., Shenzhen (CN)

(72) Inventors: Hejin Gu, Shenzhen (CN); Long Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/285,632

(22) PCT Filed: Oct. 15, 2019

(86) PCT No.: PCT/CN2019/111130
§ 371 (c)(1),
(2) Date: Apr. 15, 2021

(87) PCT Pub. No.: WO2020/078337
PCT Pub. Date: Apr. 23, 2020

(65) Prior Publication Data
US 2021/0385328 A1 Dec. 9, 2021

(30) Foreign Application Priority Data
Oct. 15, 2018 (CN) .......................... 201811198981.X

(51) Int. Cl.
*H04M 3/42* (2006.01)
*G06F 40/58* (2020.01)

(52) U.S. Cl.
CPC ........ *H04M 3/42348* (2013.01); *G06F 40/58* (2020.01)

(58) Field of Classification Search
CPC .......................... H04M 3/42348; G06F 40/58
(Continued)

(56) References Cited

U.S. PATENT DOCUMENTS

2004/0243392 A1* 12/2004 Chino ................... G06F 40/58
704/7
2007/0041370 A1* 2/2007 Cleveland ............... G06F 40/58
370/352
(Continued)

FOREIGN PATENT DOCUMENTS

CN          201018626 Y    2/2008
CN          101340676 A    1/2009
(Continued)

*Primary Examiner* — Binh Kien Tieu
(74) *Attorney, Agent, or Firm* — Conley Rose, P.C.

(57) ABSTRACT

A method includes: a first electronic device establishes a call connection to a second electronic device and then displays a call interface; after receiving a first operation of a first user, in response to the first operation, the first electronic device switches from displaying the call interface to displaying a translation interface; the first electronic device receives a first speech of the first user in a first language and sends the first speech to the second electronic device; in response to the first speech, the translation interface sequentially displays at least a first text and a second text, where the first text is obtained by recognizing the first speech, and the second text is obtained by translating the first speech into a target language; and when the translation interface displays the second text, the first electronic device sends a machine speech in the target language to the second electronic device.

20 Claims, 22 Drawing Sheets

(58) Field of Classification Search
USPC .................................................... 379/142.1
See application file for complete search history.

(56) References Cited

U.S. PATENT DOCUMENTS

| | | | | |
|---|---|---|---|---|
| 2009/0248392 | A1* | 10/2009 | Talwar | H04L 51/063 |
| | | | | 704/3 |
| 2011/0261810 | A1* | 10/2011 | Trovel | H04M 3/42365 |
| | | | | 370/352 |
| 2012/0035907 | A1 | 2/2012 | Lebeau et al. | |
| 2013/0073276 | A1* | 3/2013 | Sarikaya | H04M 3/42 |
| | | | | 704/2 |
| 2013/0289971 | A1 | 10/2013 | Parkinson et al. | |
| 2013/0326347 | A1* | 12/2013 | Albright | G06F 9/454 |
| | | | | 715/265 |
| 2014/0058838 | A1* | 2/2014 | Verma | G06Q 30/02 |
| | | | | 705/14.54 |
| 2014/0242955 | A1 | 8/2014 | Kang et al. | |
| 2015/0095011 | A1 | 4/2015 | Furihata et al. | |
| 2015/0179173 | A1* | 6/2015 | Cho | G10L 15/26 |
| | | | | 704/235 |
| 2015/0286635 | A1* | 10/2015 | Donabedian | G06F 16/13 |
| | | | | 705/2 |
| 2015/0347399 | A1 | 12/2015 | Aue et al. | |
| 2015/0350451 | A1 | 12/2015 | Aue et al. | |
| 2017/0147558 | A1* | 5/2017 | Kim | G06F 40/58 |
| 2017/0270103 | A1* | 9/2017 | Golan | H04W 4/02 |
| 2019/0303443 | A1* | 10/2019 | Furukawa | G06F 40/103 |
| 2019/0347331 | A1* | 11/2019 | Yu | G10L 15/26 |
| 2021/0312143 | A1* | 10/2021 | Trehan | G06F 40/58 |
| 2021/0377642 | A1* | 12/2021 | Luo | H04R 1/1016 |

FOREIGN PATENT DOCUMENTS

| | | |
|---|---|---|
| CN | 101052069 B | 9/2010 |
| CN | 102360347 A | 2/2012 |
| CN | 102903361 A | 1/2013 |
| CN | 103533129 A | 1/2014 |
| CN | 103970734 A | 8/2014 |
| CN | 104010267 A | 8/2014 |
| CN | 104303177 A | 1/2015 |
| CN | 104796536 A | 7/2015 |
| CN | 105117391 A | 12/2015 |
| CN | 106462573 A | 2/2017 |
| CN | 107465816 A | 12/2017 |
| CN | 107465887 A | 12/2017 |
| CN | 206863740 U | 1/2018 |
| CN | 107833577 A | 3/2018 |
| CN | 107909994 A | 4/2018 |
| CN | 108009159 A | 5/2018 |
| CN | 108650419 A | 10/2018 |

* cited by examiner

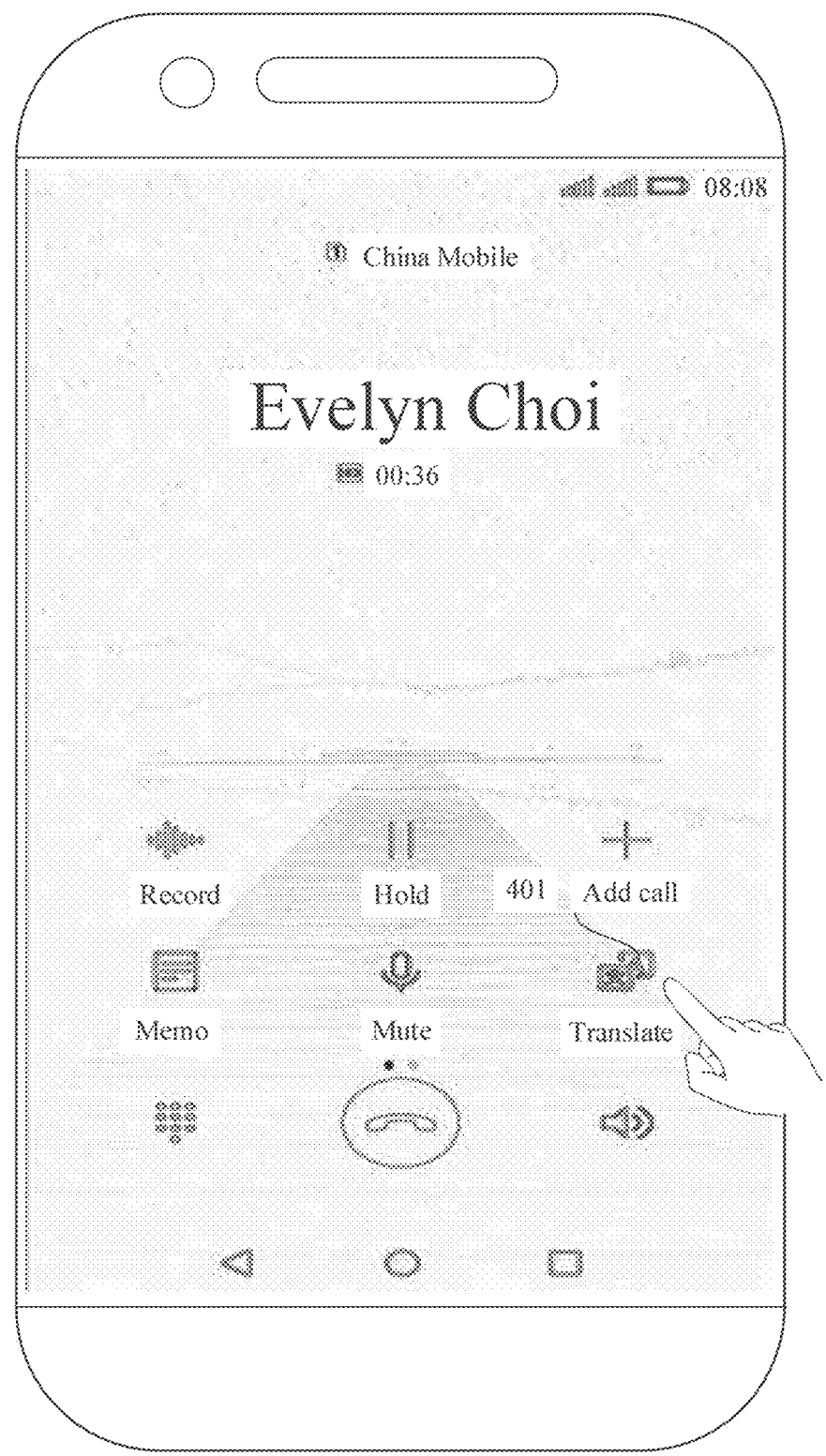
FIG. 4g1

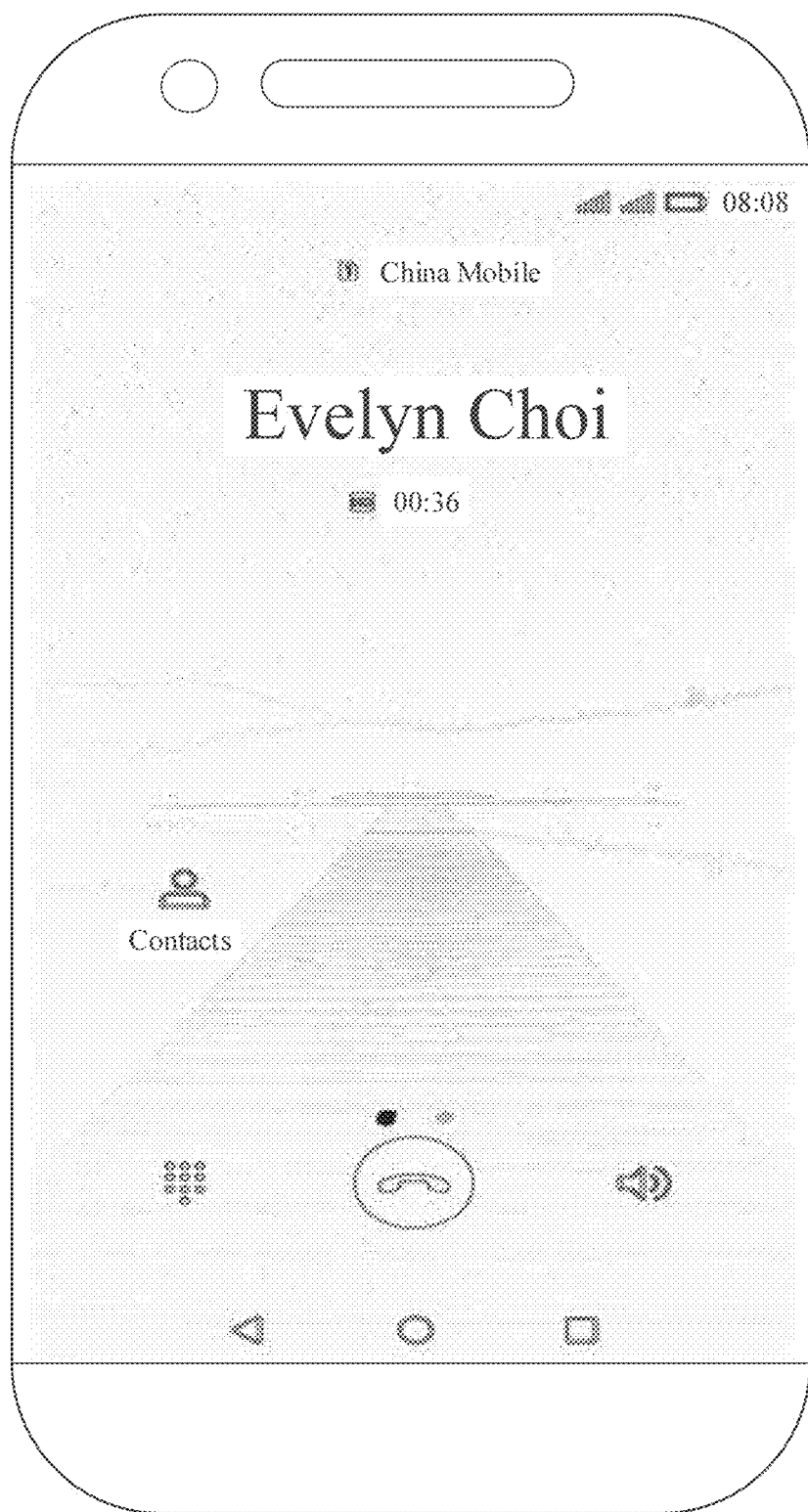
FIG. 4g2

CONT. FROM FIG. 7a

TO FIG. 7c

TRANSLATION METHOD AND ELECTRONIC DEVICE

CROSS-REFERENCE TO RELATED APPLICATIONS

This application is a U.S. National Stage of International Patent Application No. PCT/CN2019/111130 filed on Oct. 15, 2019, which claims priority to Chinese Patent Application No. 201811198981.X filed on Oct. 15, 2018. Both of the aforementioned applications are hereby incorporated by reference in their entireties.

TECHNICAL FIELD

This application relates to the field of terminal technologies, and in particular, to a translation method and an electronic device.

BACKGROUND

In recent years, with rapid development of the electronics industry and communications technologies, there is an increasing quantity of smart home devices, for example, mobile phones, smart speakers, and smart bands, and people's life becomes increasingly intelligent. Due to portability of the mobile phones and an ability to download application software with various functions from an application store, the mobile phones have become an indispensable necessity in people's daily life.

With continuous development and progress of trade and communication between countries, the trend of user internationalization inevitably leads to a problem of poor communication between people speaking different languages. Taking a call between users who are native speakers of Chinese and English as an example, a user who uses Chinese needs to be proficient in English to communicate with an English user, and few English users understand Chinese. Therefore, a language becomes a biggest obstacle to international communication, and a need for instant language translation during a call becomes increasingly important.

Currently, the prior art can implement instant language translation during a call. However, if a language type needs to be switched, the call needs to be interrupted, and a call is initiated again after the language type is successfully set. In addition, a delay exists in a translation process. As a result, a post-translation machine speech may overlap with a user's speech during the call.

SUMMARY

This application provides a translation method and an electronic device, so that two parties in a call who use different languages can achieve smooth and real-time verbal communication by using a translation function of the electronic device.

According to a first aspect, an embodiment of this application provides a translation method, where the method is applicable to a first electronic device, and the method includes: The first electronic device establishes a call connection to a second electronic device and displays a call interface of the first electronic device; then the first electronic device receives a first operation of a first user; in response to the first operation, the first electronic device switches from displaying the call interface to displaying a translation interface; then the first electronic device receives a first speech of the first user in a first language and sends the first speech to the second electronic device; in response to the first speech, the translation interface of the first electronic device sequentially displays at least a first text and a second text, where the first text is obtained by recognizing the first speech, and the second text is obtained by translating the first speech into a target language; and when the translation interface displays the second text, the first electronic device sends a machine speech in the target language to the second electronic device, where the machine speech in the target language is obtained by translating the first speech into the target language. According to this method, a machine speech and a text that are in a target language can be synchronized, so as to avoid a problem that a user has completed reading a post-translation text but a machine speech has not been received yet.

Further, the first electronic device receives a language setting operation performed by the first user on the translation interface; in response to the language setting operation, the first electronic device switches from displaying the translation interface to displaying a language settings interface, where the language settings interface includes a setting control of a second language; the first electronic device receives a confirmation operation performed by the first user on the setting control of the second language; in response to the confirmation operation, the first electronic device sets the target language to the second language; then the first electronic device receives an on-hook operation performed by the first user on the call interface; and in response to the on-hook operation, the first electronic device terminates the call connection. In this method, a language setting can be changed during a call, so that a translation function is more user-friendly.

In a possible design, the first electronic device may obtain an international area code from a phone number dialed by the first user, and then based on the international area code, set the target language to an official language of a country corresponding to the international area code. In other words, the first electronic device may automatically set a target language without a manual operation of a user, so that the translation function is more user-friendly.

In a possible design, after in response to the first speech, and before the translation interface sequentially displays at least the first text and the second text, the method further includes: obtaining the first text by recognizing the first speech, and translating the first text into the second text in the target language; and converting the second text into the machine speech in the target language. In other words, in this embodiment of this application, a user speech can be translated by using the foregoing method. Both a text and a machine speech are obtained through translation, so that a user can easily understand call content of the other party.

In a possible design, the method further includes: The first electronic device receives a second speech of the first user in the target language and sends the second speech to the second electronic device; then the first electronic device receives a close operation performed by the first user on a control of reading self-translation on the translation interface; and in response to the close operation, the electronic device displays the translation interface, where the translation interface further includes a third text in the target language, and the third text is obtained by recognizing the second speech.

In this embodiment of this application, a user independently enables or disables a translation function of the user's own speech, so that invalid translation can be reduced, and call smoothness can be improved.

In a possible design, the method further includes: The first electronic device receives a second speech of the first user in the target language and sends the second speech to the second electronic device; when detecting that a language corresponding to the second speech is the target language, in response to the second speech, the electronic device skips translating the second speech and displays the translation interface, where the translation interface further includes a third text in the target language.

In this embodiment of this application, a translation function of a user's own speech is automatically disabled, so that invalid translation can be reduced, and call smoothness can be improved.

In a possible design, after the first electronic device sends the machine speech in the target language to the second electronic device and before the first electronic device receives the on-hook operation performed by the first user on the call interface, the method further includes: receiving a third speech that is in the target language and that is sent by the second electronic device; in response to the third speech, displaying the translation interface, where the translation interface further includes a fourth text in the target language and a fifth text in the first language, the fourth text in the target language is obtained by recognizing the third speech, and the fifth text in the first language is obtained by translating the third speech into the target language; and when the first electronic device receives a machine speech that is in the first language and that is sent by the second electronic device, displaying the fifth text on the translation interface, where the machine speech in the first language is obtained by translating the third speech into the target language.

In this embodiment of this application, the first electronic device may receive a speech and a machine speech that are sent by a peer user, thereby implementing smooth and real-time verbal communication.

In a possible design, the first electronic device plays, by using an earpiece of the first electronic device, the third speech that is in the target language and that is sent by the second electronic device; and after the first electronic device receives the machine speech that is in the first language and that is sent by the second electronic device, and before the first electronic device receives the on-hook operation performed by the first user on the call interface, the method further includes: playing the machine speech in the first language by using a speaker of the first electronic device. The method may help a user understand call content of a peer user in different scenarios.

In a possible design, before the first electronic device receives the on-hook operation performed by the first user on the call interface, the method further includes: receiving a close operation performed by the first user on a mute control on the translation interface; and in response to the close operation, stopping playing the machine speech in the first language. In this way, the translation function may be more user-friendly, thereby improving user experience.

In a possible design, when the first electronic device plays the machine speech in the first language by using the speaker of the first electronic device, the method further includes: receiving a fourth speech of the first user in the first language; and in response to the fourth speech, displaying prompt information, where the prompt information is used to instruct the first user to send a speech after the machine speech in the first language is played. Using the method, when a user speaks excessively fast, or an interval between consecutive speeches sent by the user is excessively short, the electronic device may display prompt information on the translation interface, to remind the user to slow down a speaking rate, so as to avoid overlapping between a machine speech and the user's speech.

In a possible design, the method further includes: receiving an exit operation performed by the first user on the translation interface; in response to the exit operation, switching from displaying the translation interface to displaying the call interface; receiving a fifth speech of the first user in the first language; and sending the fifth speech to the second electronic device. In this way, it is convenient for a user to enable the translation function according to an actual requirement, which is more user-friendly and personalized and improves user experience.

According to a second aspect, an embodiment of this application provides an electronic device, including a processor and a memory. The memory is configured to store one or more computer programs. When the one or more computer programs stored in the memory are executed by the processor, the electronic device is enabled to implement the method in any one of the possible designs in any one of the foregoing aspects.

According to a third aspect, an embodiment of this application further provides an apparatus. The apparatus includes modules/units for performing the method in any one of the possible designs in any one of the foregoing aspects. These modules/units may be implemented by hardware, or may be implemented by hardware by executing corresponding software.

According to a fourth aspect, an embodiment of this application further provides a computer-readable storage medium, where the computer-readable storage medium includes a computer program. When the computer program is run on an electronic device, the electronic device performs the method in any one of the possible designs in any one of the foregoing aspects.

According to a fifth aspect, an embodiment of this application further provides a computer program product. When the computer program product is run on a terminal, the electronic device performs the method in any one of the possible designs in any one of the foregoing aspects.

These aspects or other aspects of this application are more concise and understandable in the following descriptions of embodiments.

DESCRIPTION OF EMBODIMENTS

For ease of understanding, descriptions of some concepts related to embodiments of this application are provided as examples for reference, as shown in the following.

Machine translation, also referred to as automatic translation, is a process of converting one natural language (source language) into another natural language (target language) by using a computer.

The following describes the technical solutions in the embodiments of this application with reference to the accompanying drawings in the embodiments of this application. In the following descriptions of the embodiments of this application, terms "first" and "second" are merely used for a purpose of descriptions, and shall not be understood as an indication or implication of relative importance or an implicit indication of a quantity of indicated technical features. Therefore, a feature limited by "first" or "second" may explicitly or implicitly include one or more features. A first language and a second language in the following refer to natural languages, and a first speech and a second speech refer to sounds made by a user. In the description of the embodiment of this application, unless otherwise stated, "multiple" means two or more than two.

Figure 1:
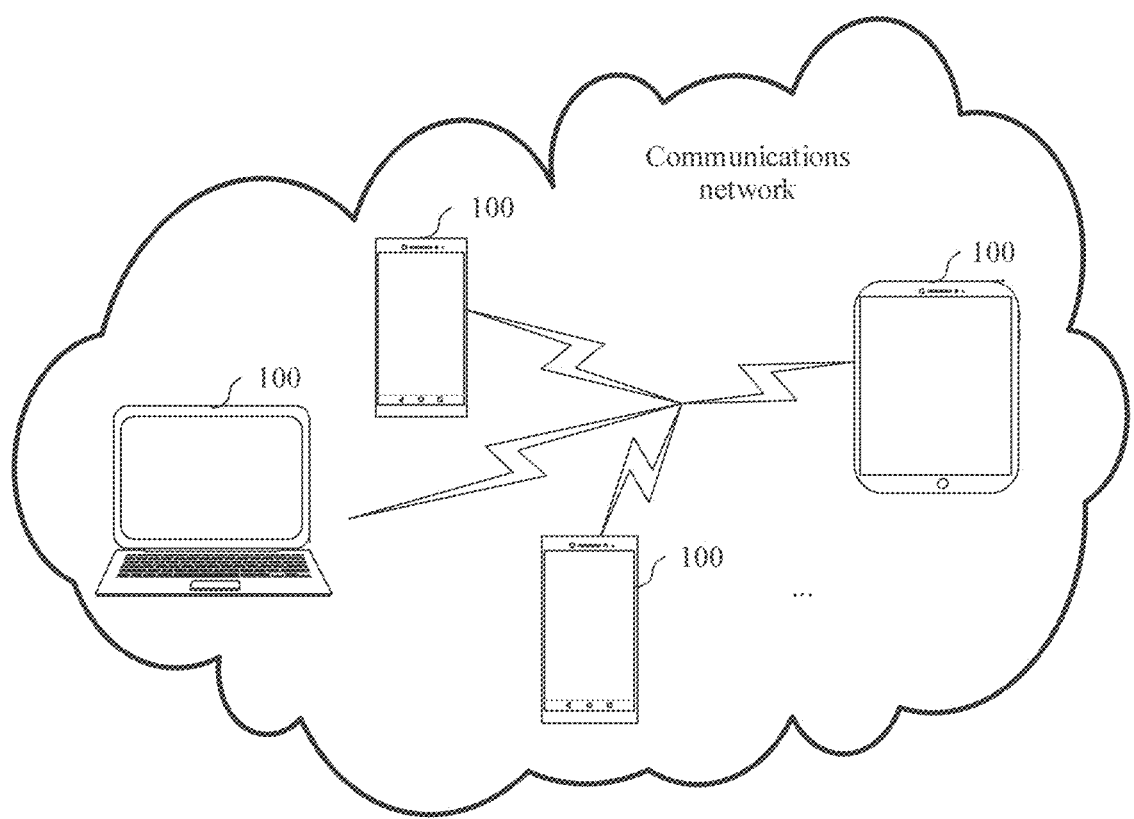
FIG. 1 is a schematic diagram of an interconnection scenario according to an embodiment of this application.

The translation method provided in the embodiments of this application may be applied to a scenario shown in FIG. 1 in which a plurality of electronic devices 100 is interconnected based on a communications network. The communications network may be a local area network, or may be a wide area network switched by using a relay (relay) device. When the communications network is a local area network, for example, the communications network may be a short-distance communications network such as a WiFi hotspot network, a WiFi P2P network, a Bluetooth network, a ZigBee network, or a near field communication (near field communication, NFC) network. When the communications network is a wide area network, for example, the communications network may be a third-generation mobile communications technology (3rd-generation wireless telephone technology, 3G) network, a fourth-generation mobile communications technology (the 4th generation mobile communication technology, 4G) network, a fifth-generation mobile communications technology (5th-generation mobile communication technology, 5G) network, a future evolved public land mobile network (public land mobile network, PLMN), or the Internet. In the scenario shown in FIG. 1, different electronic devices may exchange data by using the communications network, for example, exchange a picture, a text, and a video, or exchange a result obtained after the electronic devices process an object such as a picture, a text, or a video.

In some embodiments of this application, the electronic device 100 shown in FIG. 1 may be a portable electronic device that further includes another function such as a personal digital assistant function and/or a music player function, for example, a mobile phone, a tablet computer, or a wearable device (such as a smartwatch) having a wireless communication function. An example embodiment of a portable electronic device includes but is not limited to a portable electronic device using iOS®, Android®, Microsoft®, or another operating system. The portable electronic device may also be another portable electronic device, such as a laptop computer (laptop) having a touch-sensitive surface (for example, a touch panel). It may be further understood that in some other embodiments of this application, the electronic device 100 may alternatively not be a portable electronic device, but a desktop computer having a touch-sensitive surface (for example, a touch panel).

Figure 2:
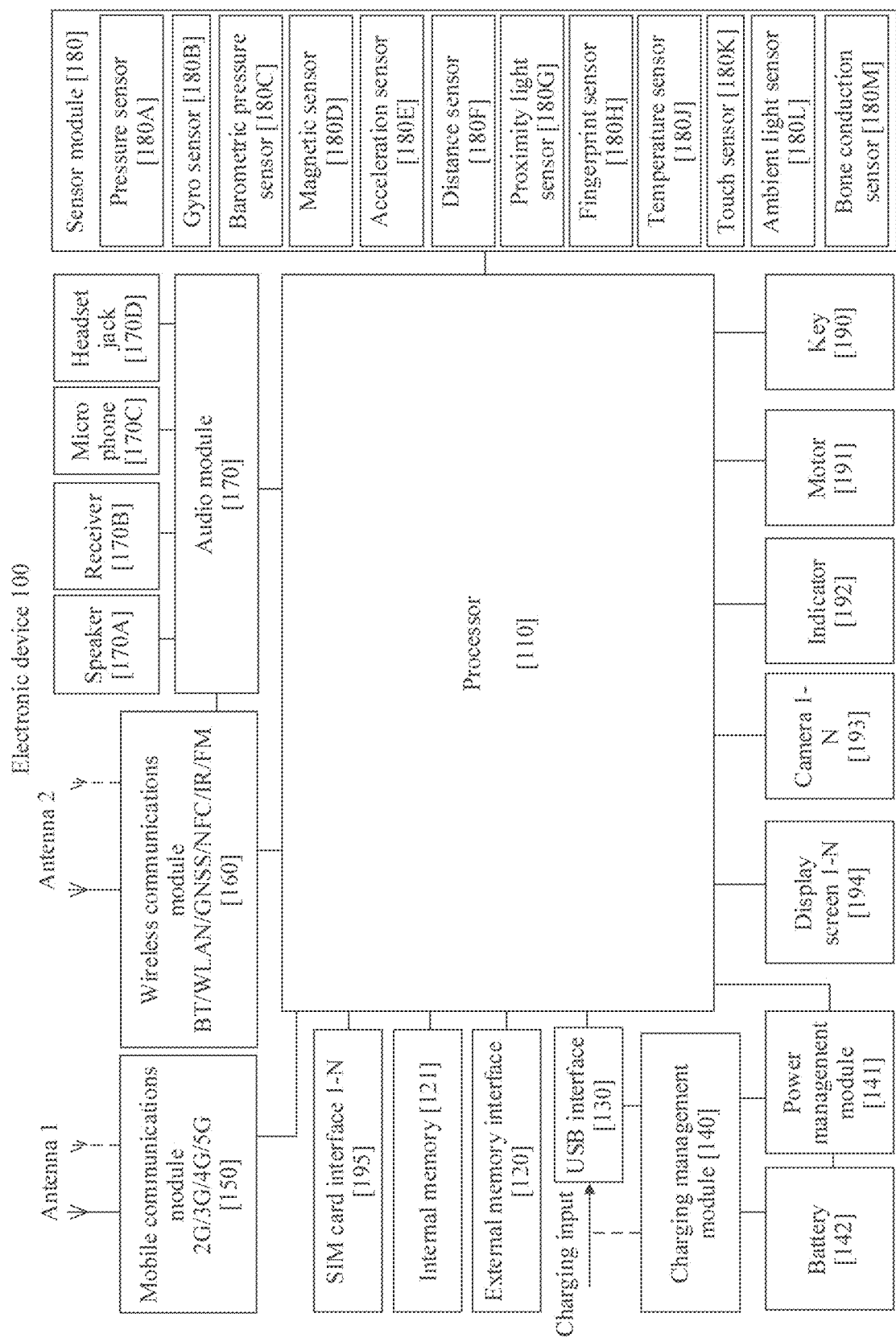
FIG. 2 is a schematic structural diagram of a mobile phone according to an embodiment of this application.

For example, as shown in FIG. 2, the following uses the electronic device 100 as an example to specifically describe an embodiment.

The electronic device 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display screen 194, a SIM card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It should be understood that a structure illustrated in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processor (Neural-network Processing Unit, NPU). Different processing units may be independent devices, or may be integrated into one or more processors.

The controller may be a nerve center and a command center of the electronic device 100. The controller may generate an operation control signal according to instruction operation code and a timing signal, so as to complete control of fetching an instruction and executing an instruction.

The memory may further be disposed in the processor 110 and is configured to store an instruction and data. In some embodiments, the memory in the processor 110 is a cache. The memory may store an instruction or data that has just been used or cyclically used by the processor 110. If the processor 110 needs to use the instruction or the data again, the instruction or the data may be directly invoked from the memory, which avoids repeated access, reduces a waiting time of the processor 110, and therefore improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a camera flash, the camera 193, and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the electronic device 100.

The I2S interface may be used for audio communication. In some embodiments, the processor 110 may include a plurality of groups of I2S buses. The processor 110 may be coupled to the audio module 170 by using the I2S bus, thereby implementing communication between the processor 110 and the audio module 170. In some embodiments, the audio module 170 may send an audio signal to the wireless communications module 160 by using the I2S interface, thereby implementing a function of answering a call through a Bluetooth headset.

The PCM interface may also be used for audio communication, sampling, quantizing, and encoding an analog signal. In some embodiments, the audio module 170 and the wireless communications module 160 may be coupled by using the PCM bus interface. In some embodiments, the audio module 170 may also send an audio signal to the wireless communications module 160 by using the PCM interface, thereby implementing the function of answering a call through a Bluetooth headset. Both the I2S interface and the PCM interface may be used for audio communication.

The UART interface is a universal serial data bus used for asynchronous communication. The bus may be a bidirectional communications bus that converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 by using the UART interface, thereby implementing a Bluetooth function. In some embodiments, the audio module 170 may send an audio signal to the wireless communications module 160 by using the UART interface, thereby implementing a function of playing music through a Bluetooth headset.

The MIPI interface may be configured to connect the processor 110 to a peripheral device such as the display screen 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, thereby implementing a photographing function of the electronic device 100. The processor 110 communicates with the display screen 194 by using the DSI interface, thereby implementing a display function of the electronic device 100.

The GPIO interface may be configured by software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, and the like. The GPIO interface may also be configured as an I2C interface, an I2S interface, a UART interface, a MIPI interface, or the like.

The USB interface 130 is an interface that conforms to USB standard specifications, and may be specifically a Mini USB interface, a Micro USB interface, a USB Type C interface, or the like. The USB interface may be configured to connect to a charger to charge the electronic device 100, or may be configured to transmit data between the electronic device 100 and a peripheral device. The USB interface may also be configured to connect to a headset to play audio through the headset. The interface may be further configured to connect to another electronic device, for example, an AR device.

It should be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from those in the foregoing embodiment or a combination of a plurality of interface connection manners.

The charging management module 140 is configured to receive a charging input from a charger. The charger may be a wireless charger, or may be a wired charger. In some wired charging embodiments, the charging management module 140 may receive a charging input from a wired charger through a USB interface. In some wireless charging embodiments, the charging management module 140 may receive a wireless charging input by using a wireless charging coil of the electronic device 100. When charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle quantity, and a battery health status (leakage and impedance). In some other embodiments, the power management module 141 may also be disposed in the processor 110. In some other embodiments, the power management module 141 and the charging management module 140 may also be disposed in a same device.

A wireless communication function of the electronic device 100 may be implemented by using the antenna module 1, the antenna module 2, the mobile communications module 150, the wireless communications module 160, the modem processor, the baseband processor, and the like.

The antenna 1 and the antenna 2 are configured to send and receive an electromagnetic wave signal. Each antenna in the electronic device 100 may be configured to cover one or more communications frequency bands. Different antennas may be multiplexed to improve utilization of the antennas. For example, a cellular network antenna may be multiplexed into a diversity antenna used in a wireless local area network. In some other embodiments, the antenna may be used in combination with a tuning switch.

The mobile communications module 150 may provide a wireless communications solution that is applied to the electronic device 100 and that includes 2G, 3G, 4G, 5G, and the like. The mobile communications module 150 may include at least one filter, a switch, a power amplifier, a low noise amplifier (Low Noise Amplifier, LNA), and the like. The mobile communications module 150 may receive an electromagnetic wave by using the antenna 1, perform processing such as filtering and amplification on the received electromagnetic wave, and transfer the electromagnetic wave to the modem processor for demodulation. The mobile communications module 150 may also amplify a signal modulated by the modem processor, and convert the signal into an electromagnetic wave and radiate the electromagnetic wave out by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is sent to the application processor. The application processor outputs a sound signal by using an audio device (not limited to the speaker 170A, the receiver 170B, and the like), or displays an image or a video by using the display screen 194. In some embodiments, the modem processor may be an independent device. In some other embodiments, the modem processor may be independent of the processor 110, and be disposed in a same device with the mobile communications module 150 or another functional module.

The wireless communications module 160 may provide a wireless communications solution that is applied to the electronic device 100 and that includes a wireless local area network (wireless local area networks, WLAN), Bluetooth (bluetooth, BT), a global navigation satellite system (global navigation satellite system, GNSS), frequency modulation (frequency modulation, FM), a near field wireless communication technology (near field communication, NFC), an infrared technology (infrared, IR), and the like. The wireless communications module 160 may be one or more devices integrating at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may also receive a to-be-sent signal from the processor 110, perform frequency modulation and amplification on the signal, and convert the signal into an electromagnetic wave and radiate the electromagnetic wave out by using the antenna 2. In this embodiment of this application, the wireless communications module 160 is configured to send a speech of a first user and a post-translation machine speech in a target language, or a speech in the target language sent by a peer user and a post-translation machine speech in a first language.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based enhancement system (satellite based augmentation systems, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel. The display panel may use an LCD (liquid crystal display, liquid crystal display), an OLED (organic light-emitting diode, organic light-emitting diode), an active-matrix organic light-emitting diode or an active-matrix organic light-emitting diode (active-matrix organic light emitting diode, AMOLED), a flexible light-emitting diode (flex light-emitting diode, FLED), a Miniled, a MicroLed, a Micro-oLed, a quantum dot light-emitting diode (quantum dot light emitting diodes, QLED), and the like. In some embodiments, the electronic device 100 may include one or N display screens, where N is a positive integer greater than 1. In this embodiment of this application, the display screen 194 may be configured to display a call interface, a translation interface, a language settings interface, and the like.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is opened, light is transferred to a photosensitive element of a camera by using a lens, an optical signal is converted into an electrical signal, and the photosensitive element of the camera sends the electrical signal to an ISP for processing, so that the electrical signal is converted into an image visible to naked eyes. The ISP may also perform algorithm optimization on image noise, brightness, and a skin color. The ISP may also optimize parameters such as exposure and a color temperature of a shooting scenario. In some embodiments, the ISP may be disposed in the camera 193.

The camera 193 is configured to capture a static image or a video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then sends the electrical signal to the ISP to convert the electrical signal into a digital image signal. The ISP outputs the digital image signal to the DSP for processing. The DSP converts the digital image signal into an image signal in a standard format, such as RGB and YUV. In some embodiments, the electronic device 100 may include one or N cameras, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transform or the like on frequency energy.

The video codec is configured to compress or decompress a digital video. The digital 100 may support one or more types of video codecs. In this way, the electronic device 100 may play or record videos in a plurality of encoding formats, for example, MPEG1, MPEG2, MPEG3 and MPEG4.

The NPU is a neural network (neural-network, NN) computing processor. By referring to a structure of a biological neural network, for example, referring to a mode of transmission between neurons in a human brain, the NPU quickly processes input information, and may further perform self-learning continuously. By using the NPU, an application such as intelligent cognition of the electronic device 100 may be implemented, for example, image recognition, face recognition, voice recognition, and text understanding.

The external memory interface 120 may be configured to connect to an external memory card, for example, a Micro SD card, to extend a storage capability of the electronic device 100. The external memory card communicates with the processor 110 by using the external memory interface 120, to implement a data storage function. For example, files such as music and videos are stored in the external memory card.

The internal memory 121 may be configured to store computer executable program code, and the executable program code includes an instruction. The processor 110 executes various function applications and data processing of the electronic device 100 by running the instruction stored in the internal memory 121. The memory 121 may include a program storage area and a data storage area. The program storage area may store an operating system, an application program required by at least one function (such as a sound playing function and an image playing function), and the like. The data storage area may store data (such as audio data and a phone book) created when the electronic device 100 is used, and the like. In addition, the memory 121 may include a high-speed random access memory, and may further include a nonvolatile memory, for example, at least one magnetic disk storage device, a flash memory device, and universal flash storage (universal flash storage, UFS).

The electronic device 100 may implement an audio function by using the audio module 170, the speaker 170A, the receiver 170B, the microphone 170C, the headset jack 170D, the application processor, and the like, such as music playing and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "speaker", is configured to convert an audio electrical signal into a sound signal. A user may listen to music or answer a hands-free call by using the speaker 170A of the electronic device 100. In this embodiment of this application, the speaker 170A is configured to play a post-translation machine speech.

The receiver 170B, also referred to as an "earpiece", is configured to convert an audio electrical signal into a sound signal. When the electronic device 100 receives a call or a voice message, a user may listen to a speech by placing the receiver 170B close to an ear.

The microphone 170C, also referred to as a "microphone" or a "microphone", is configured to convert a sound signal into an electrical signal. When making a call or sending a voice message, a user may speak after moving the microphone 170C close to the mouth, and a sound signal is input to the microphone 170C. At least one microphone 170C may be disposed in the electronic device 100. In some other embodiments, two microphones may be disposed in the electronic device 100, and in addition to collecting a sound signal, a noise reduction function may be further implemented. In some other embodiments, three, four, or more microphones may be alternatively disposed in the electronic device 100, to implement functions such as collecting a sound signal, reducing noise, identifying a sound source, and implementing a directional recording function. In this embodiment of this application, the microphone 170C may be configured to collect a speech of a user, for example, a first speech of a first user in a first language.

The headset jack 170D is configured to connect to a wired headset. The headset jack may be a USB interface, or may be a 3.5 mm standard interface of an open mobile terminal platform (open mobile terminal platform, OMTP), or a standard interface of the cellular telecommunications industry association of the USA (cellular telecommunications industry association of the USA, CTIA).

The pressure sensor 180A is configured to sense a pressure signal, and may convert the pressure signal into an electrical signal. In some embodiments, the pressure sensor 180A may be disposed in the display screen 194. There are many types of pressure sensors 180A, such as a resistive pressure sensor, an inductive pressure sensor, and a capacitive pressure sensor. The capacitive pressure sensor may include at least two parallel plates that include a conductive material. When force is applied to the pressure sensor 180A, a capacitance between electrodes changes. The electronic device 100 determines a strength of pressure based on a change in the capacitance. When a touch operation is performed on the display screen 194, the electronic device 100 detects a strength of the touch operation by using the pressure sensor 180A. The electronic device 100 may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on a short message application icon, an instruction for viewing a short message is executed. When a touch operation whose touch operation strength is greater than or equal to the first pressure threshold is performed on the short message application icon, an instruction for creating a new short message is executed.

The gyro sensor 180B may be configured to determine a motion posture of the electronic device 100. In some embodiments, angular velocities of the electronic device 100 around three axes (that is, an x-axis, a y-axis, and a z-axis) may be determined by using the gyro sensor 180B. The gyro sensor 180B may be configured to perform image stabilization during photographing. For example, when a shutter is pressed, the gyro sensor 180B detects an angle at which the electronic device 100 shakes, calculates, based on the angle, a distance for which a lens module needs to compensate, and enables a lens to counteract the shake of the electronic device 100 through a reverse motion, so as to implement image stabilization. The gyro sensor 180B may be further used in navigation and somatosensory game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a clamshell or a smart cover by using the magnetic sensor 180D. In some embodiments, when the electronic device 100 is a clamshell device, the electronic device 100 may detect opening and closing of a clamshell by using the magnetic sensor 180D. Then, a feature such as automatic unlocking of a clamshell is set based on a detected opening/closing state of the smart cover or a detected opening/closing state of the clamshell.

The acceleration sensor 180E may detect magnitudes of accelerations of the electronic device 100 in various directions (usually three axes). When the electronic device 100 is static, a magnitude and a direction of gravity may be detected. The acceleration sensor 180E may be further configured to recognize a posture of an electronic device, and is applied to applications such as landscape/portrait orientation switching and a pedometer.

The distance sensor 180F is configured to measure a distance. The electronic device 100 may measure a distance by using infrared or a laser. In some embodiments, in a photographing scenario, the electronic device 100 may measure a distance by using the distance sensor 180F, to implement fast focusing.

The proximity light sensor 180G may include, for example, a light emitting diode (LED) and an optical detector, for example, a photodiode. The light emitting diode may be an infrared light emitting diode. The electronic device 100 emits infrared light to the outside by using the light emitting diode, and the electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the proximity light sensor 180G, that a user holds the electronic device 100 close to an ear to make a call, so as to automatically turn off the screen to save power. The proximity light sensor 180G may also be used in a smart cover mode and a pocket mode to automatically unlock and lock a screen.

The ambient light sensor 180L is configured to sense luminance of ambient light. The electronic device 100 may adaptively adjust luminance of the display screen 194 based on the sensed luminance of the ambient light. The ambient light sensor 180L may also be configured to automatically adjust white balance during photographing. The ambient light sensor 180L may further cooperate with the proximity light sensor 180G to detect whether the electronic device 100 is in a pocket, to prevent an accidental touch.

The fingerprint sensor 180H is configured to collect a fingerprint. The electronic device 100 may implement fingerprint unlocking, application lock access, fingerprint-based photographing, fingerprint-based call answering, and the like by using a characteristic of a collected fingerprint.

The temperature sensor 180J is configured to detect a temperature. In some embodiments, the electronic device 100 executes a temperature processing policy by using a temperature detected by the temperature sensor 180J. For example, when a temperature reported by the temperature sensor 180J exceeds a threshold, the electronic device 100 reduces performance of a processor near the temperature sensor 180J, to reduce power consumption and implement thermal protection. In some other embodiments, when a temperature is lower than another threshold, the electronic device 100 heats the battery 142, to avoid abnormal power-off of the electronic device 100 due to a low temperature. In some other embodiments, when a temperature is lower than still another threshold, the electronic device 100 boosts an output voltage of the battery 142, to avoid abnormal power-off due to a low temperature.

The touch sensor 180K is also referred to as a "touch panel". It may be disposed in the display screen 194, and is configured to detect a touch operation performed on or near the display screen 194. The detected touch operation may be transferred to the application processor to determine a type of a touch event, and the display screen 194 provides a corresponding visual output. In some other embodiments, the touch sensor 180K may alternatively be disposed on a surface of the electronic device 100, and a location of the touch sensor 180K is different from a location of the display screen 194. In this embodiment of this application, the touch panel is configured to receive a first operation and a touch operation such as a confirmation operation, a close operation, or an exit operation on a language setting control.

The bone conduction sensor 180M may obtain a vibration signal. In some embodiments, the bone conduction sensor 180M may obtain a vibration signal from a vibration bone in a vocal part of a human body. The bone conduction sensor 180M may also be in contact with a human pulse to receive a blood pressure beating signal. In some embodiments, the bone conduction sensor 180M may also be disposed in a headset. The audio module 170 may obtain a voice signal through parsing based on a vibration signal that is obtained by the bone conduction sensor 180M from a vibration bone in a vocal part, to implement a speech function. The application processor may parse heart rate information based on a blood pressure beating signal obtained by the bone conduction sensor 180M, to implement a heart rate detection function.

The key 190 includes a power key, a volume key, and the like. The key may be a mechanical key or may be a touch key. The electronic device 100 may receive a key input, and generate a key signal input related to a user setting and function control of the electronic device 100.

The motor 191 may generate a vibration prompt. The motor 191 may be configured to provide a vibration prompt for an incoming call, or may be configured to provide a touch vibration feedback. For example, touch operations performed on different applications (for example, photographing and audio playing) may correspond to different vibration feedback effects. For touch operations performed on different areas of the display screen 194, the motor 191 may also correspondingly provide different vibration feedback effects. Different application scenarios (for example, time reminder, information receiving, an alarm clock, and a game) may also correspond to different vibration feedback effects. A touch vibration feedback effect may also be customized.

The indicator 192 may be an indicator, may be configured to indicate a charging status and a battery level change, or may be configured to indicate a message, a missed call, a notification, and the like.

The SIM card interface 195 is configured to connect to a subscriber identity module (subscriber identity module, SIM). A SIM card may be inserted into the SIM card interface or removed from the SIM card interface to implement contact with and separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of SIM cards can be inserted into a same SIM card interface. The plurality of SIM cards may be of a same type, or may be of different types. The SIM card interface 195 may also be compatible with different types of SIM cards. The SIM card interface 195 may also be compatible with an external memory card. The electronic device 100 interacts with a network by using a SIM card, to implement functions such as a call and data communication. In some embodiments, the electronic device 100 uses an eSIM card, that is, an embedded SIM card. The eSIM card may be embedded in the electronic device 100, and cannot be separated from the electronic device 100. A software system of the electronic device 100 may use a layered architecture, an event-driven architecture, a microkernel architecture, a microservice architecture, or a cloud architecture. In this embodiment of the present invention, an Android system with a layered architecture is used as an example to describe a software structure of the electronic device 100.

Figure 3:
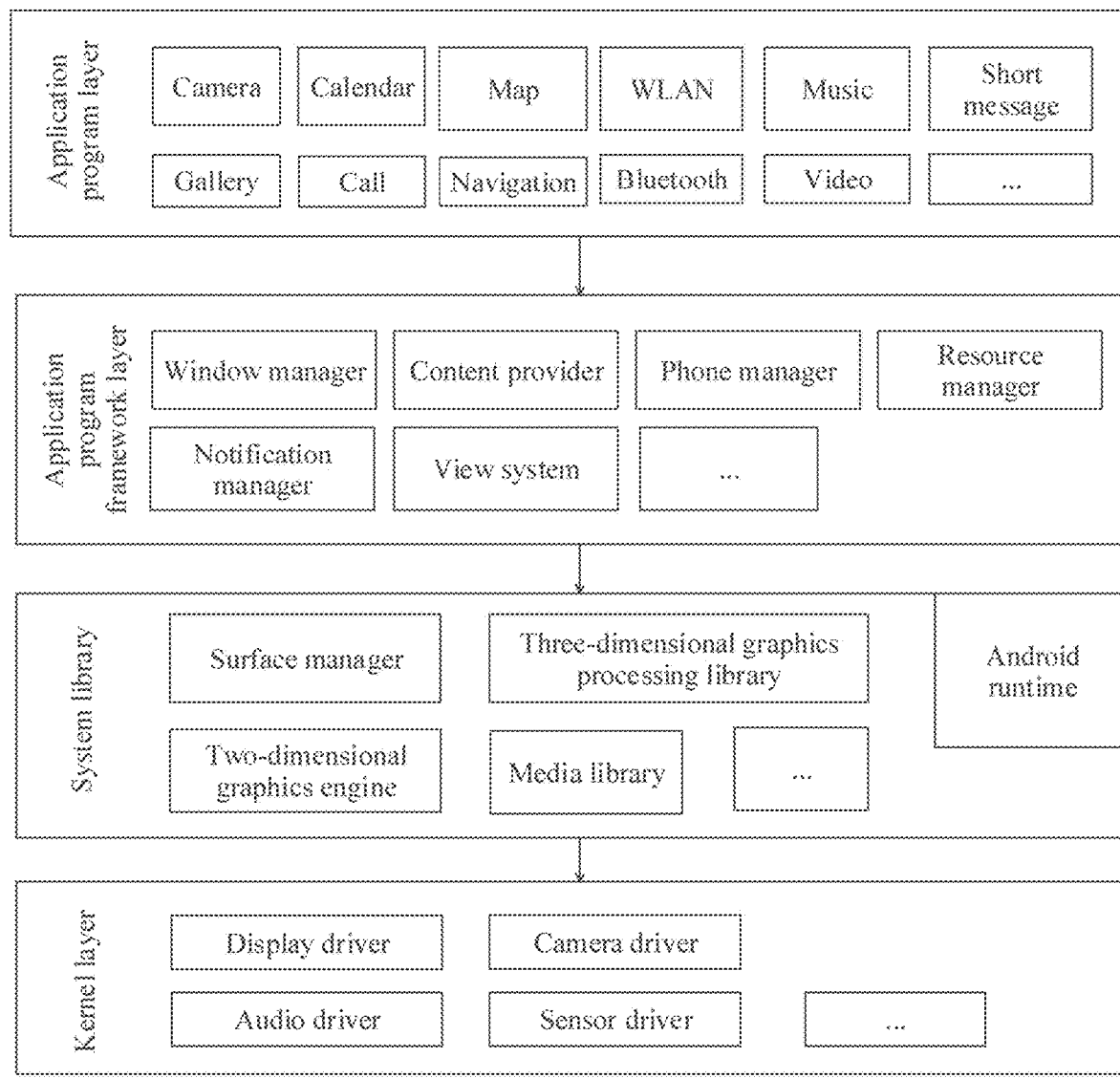
FIG. 3 is a schematic structural diagram of an Android operating system according to an embodiment of this application.

FIG. 3 is a block diagram of a software structure of an electronic device 100 according to an embodiment of the present invention.

In the layered architecture, software is divided into several layers, and each layer has clear roles and responsibilities. The layers communicate with each other through a software interface. In some embodiments, the Android system is divided into four layers. From top to bottom, they are: an application program layer, an application program framework layer, Android runtime (Android runtime) and a system library, and a kernel layer.

The application program layer may include a series of application program packages.

As shown in FIG. 3, the application program packages may include application programs such as phone, camera, gallery, calendar, call, map, navigation, WLAN, Bluetooth, music, video, and short message.

The application program framework layer provides an application programming interface (application programming interface, API) and a programming framework for an application program at the application program layer. The application program framework layer includes some predefined functions.

As shown in FIG. 3, the application program framework layer may include a window manager, a content provider, a view system, a phone manager, a resource manager, a notification manager, and the like.

The window manager is configured to manage a window program. The window manager may obtain a size of a display screen, determine whether there is a status bar, lock the screen, capture the screen, and the like.

The content provider is configured to store and obtain data and to make the data accessible to an application program. The data may include a video, an image, audio, calls made and answered, a browsing history and a bookmark, a phone book, and the like.

The view system includes a visualization control, for example, a control for displaying a text or a control for displaying a picture. The view system may be configured to build an application program. A display interface may include one or more views. For example, a display interface including a short message notification icon may include a view for displaying a text and a view for displaying a picture.

The phone manager is configured to provide a communication function of the electronic device 100, for example, management of a call status (including connected and on-hook).

The resource manager provides various resources for application programs, such as a localized character string, an icon, a picture, a layout file, and a video file.

The notification manager enables an application program to display notification information in a status bar. The notification manager may be configured to convey a notification-type message that automatically disappears after a short period of time, without user interaction. For example, the notification manager is configured to notify that download is completed, provide a message reminder, and the like. Alternatively, the notification manager may be a notification that appears in a status bar at the top of a system in a form of a chart or a scroll bar text, for example, a notification of an application program running in the background, or may be a notification that appears on a screen in a form of a dialog window. For example, text information is prompted in a status bar, a prompt tone is emitted, an electronic device vibrates, and an indicator blinks.

The Android runtime includes a core library and a virtual machine. The Android runtime is responsible for scheduling and managing an Android system.

The core library includes two parts: One is a performance function that needs to be called by a Java language, and the other is an Android core library.

The application program layer and the application program framework layer run in the virtual machine. The virtual machine executes Java files at the application program layer and the application program framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and combine 2D and 3D graphic layers for a plurality of application programs.

The media library supports playback and recording of audio and videos in a plurality of commonly used formats, as well as static image files. The media library may support a plurality of audio and video encoding formats, such as MPEG4, H.264, MP3, AAC, AMR, JPG, and PNG.

The three-dimensional graphics processing library is configured to implement three-dimensional graphics drawing, image rendering and compositing, graphic layer processing, and the like.

The 2D graphics engine is a drawing engine for 2D drawing.

The kernel layer is a layer between hardware and software. The kernel layer includes at least a display driver, a camera driver, an audio driver, and a sensor driver.

All the following embodiments may be implemented on the electronic device 100 that has the foregoing hardware structure. In the following embodiments, the electronic device 100 is used as an example to describe the translation method provided in the embodiments of this application.

According to the translation method provided in the embodiments of this application, two parties in a call who use different languages can achieve smooth and real-time verbal communication by using a translation function of an electronic device. The following describes in detail the translation method provided in the embodiments of this application with reference to the accompanying drawings and application scenarios.

Scenario 1

Figure 4A:
FIG. 4*a* to FIG. 4*e* are schematic diagrams of a group of interfaces according to an embodiment of this application.
Figure 4B:
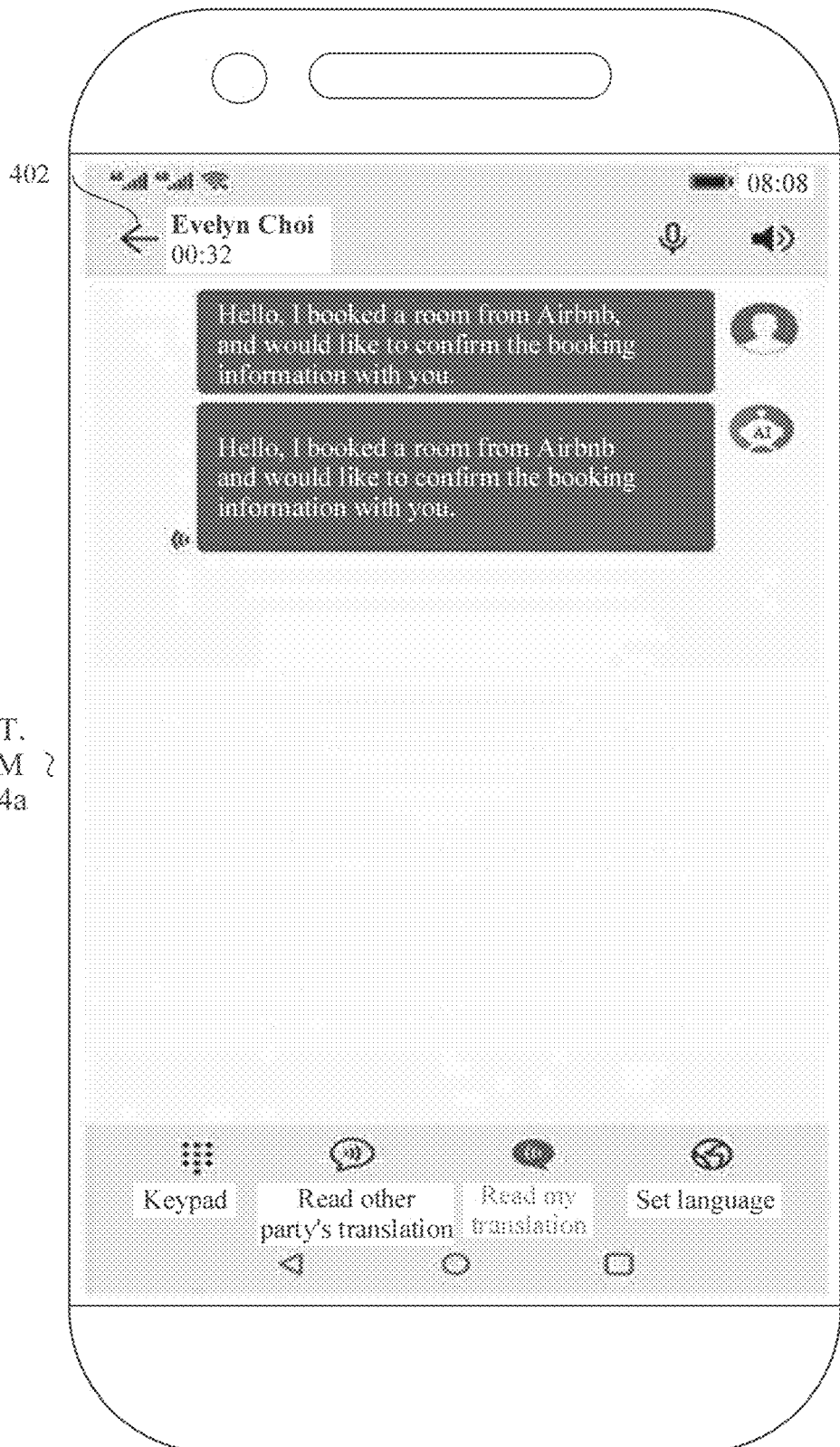

A call between a first electronic device and a second electronic device is mainly used as an example. A native language of a first user Wang of the first electronic device is Chinese, that is, a first language of the first user is Chinese. A native language of a second user Evelyn Choi of the second electronic device is English, that is, a target language of the first user is English. As shown in FIG. 4a, the first user Wang starts a phone application of the first electronic device, and calls the second user Evelyn Choi on a phone application interface. After the call is connected, because the first user Wang is not proficient in English, the first user Wang chooses to enable a translation function on an interface in FIG. 4a. In response to a first operation (for example, touching or flicking to the left) performed by the first user Wang on a function control 401 of translation on a call interface shown in FIG. 4a, the first electronic device displays a translation interface shown in FIG. 4b. The translation interface is used to display a text message and a voice message of both parties in the call.

It should be noted that an electronic device may also automatically enable a translation function by monitoring whether languages of two parties in a call are the same, and display a translation interface. For example, the first electronic device detects that the language of the first user Wang is Chinese, and the language of the other party, the second user Evelyn Choi, is English. Because the two languages are different, the translation function is automatically enabled.

Figure 4C:
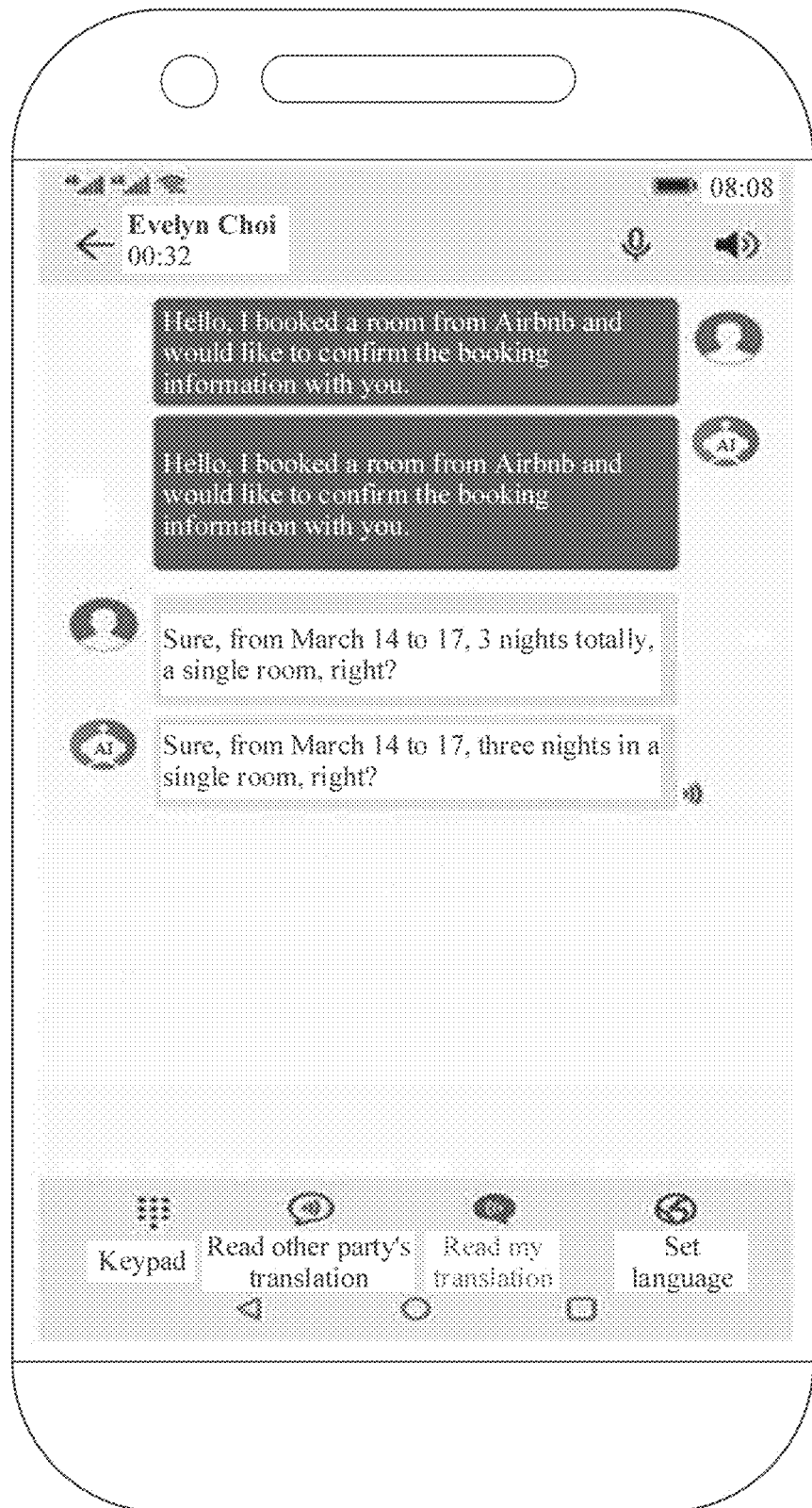

For example, when the first user Wang sends a first speech to the other party in Chinese: "Hello, I booked a room from Airbnb, and would like to confirm the booking information with you.", the first electronic device sends the first speech to the second electronic device, and at the same time automatically recognizes the first speech as a Chinese text and displays the Chinese text on the translation interface shown in FIG. 4b. Then, the first electronic device translates the Chinese text into an English text "Hello, I booked a room from Airbnb, and would like to confirm the booking information with you.", and displays the English text in an area below the Chinese text on the translation interface shown in FIG. 4b. Further, the first electronic device converts the English text into a machine speech in the English language; and after sending the Chinese speech of the first user Wang to the second user Evelyn Choi, the first electronic device further sends the machine speech in the English language to the second user Evelyn Choi. In this way, after the other party, the second user Evelyn Cho, sequentially receives the Chinese speech sent by the first user Wang and the machine speech in the English language, the second user Evelyn Choi may understand call content of the first user Wang. Then, the second user Evelyn Choi replies with a third speech in English "Sure, from Match 14 to 17, 3 nights totally, a single room, right?". In this case, the first electronic device first receives the third speech replied by the second user Evelyn Choi, and then the first electronic device automatically recognizes the third speech as a fourth text, and displays the fourth text on a translation interface shown in FIG. 4c. Then, the first electronic device translates the fourth text in English into a fifth text in Chinese "Sure, from March 14 to 17, three nights in a single room, right?", and displays the Chinese text in an area below the fourth text "Sure, from Match 14 to 17, 3 nights totally, a single room, right?" on the translation interface shown in FIG. 4b. Further, the first electronic device converts the fifth text into a machine speech in the Chinese language. The first user Wang may understand call content of the peer user by reading the Chinese text on the translation interface shown in FIG. 4c or by playing the machine speech in the Chinese language.

Figure 4D:
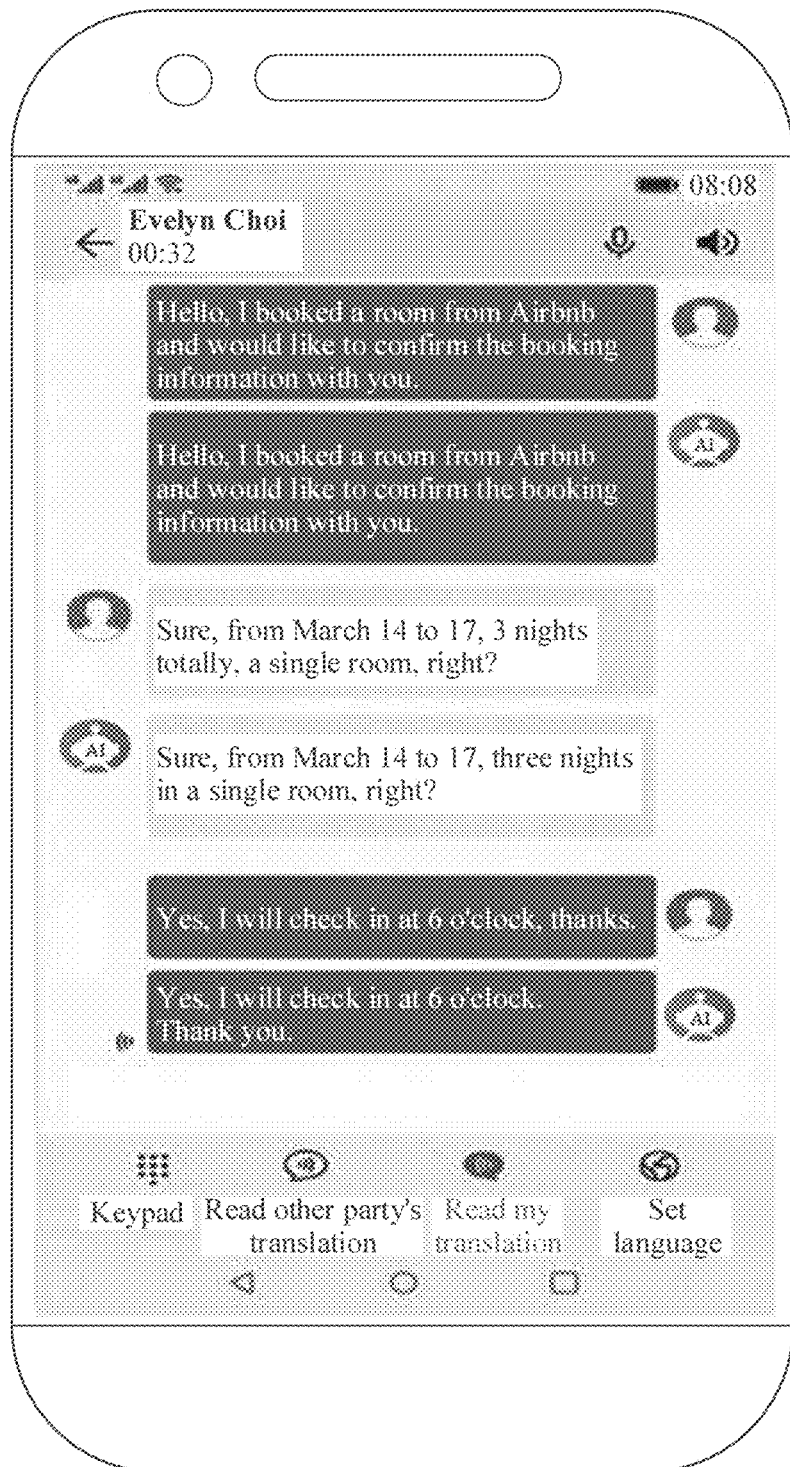
Figure 4E:
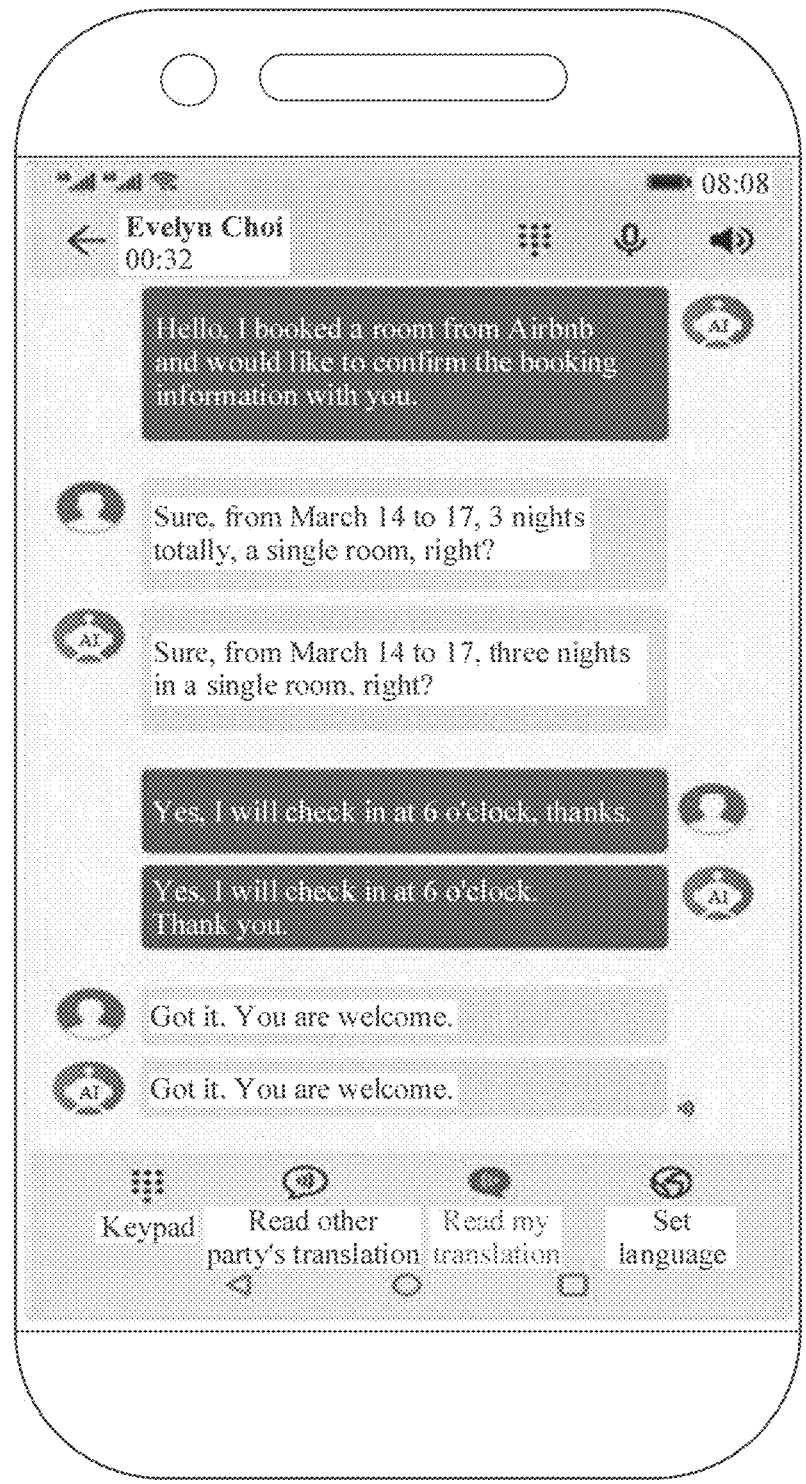
Figure 4F:
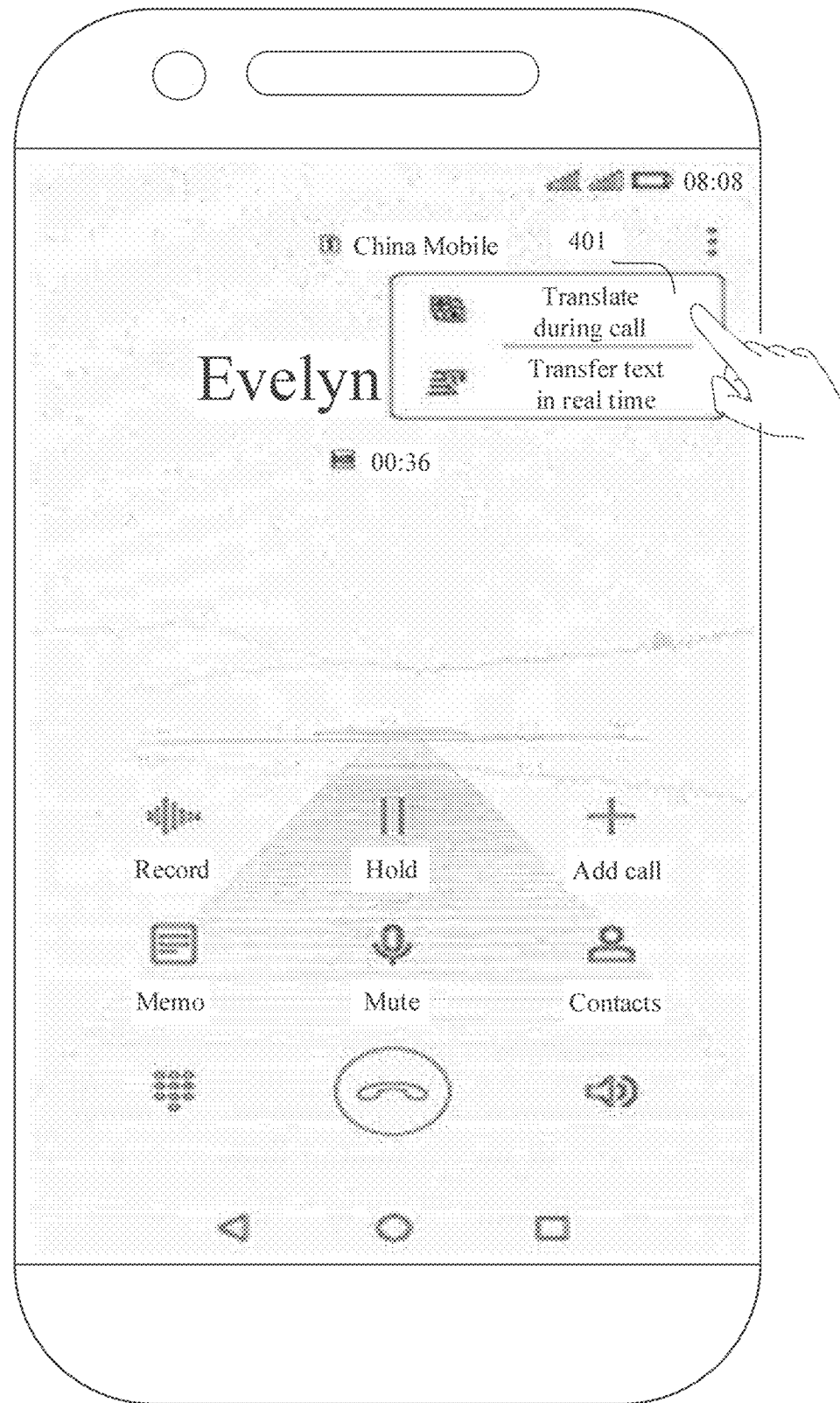
FIG. 4*f* to FIG. 4*h* are schematic diagrams of another group of interfaces according to an embodiment of this application.
Figure 4I:
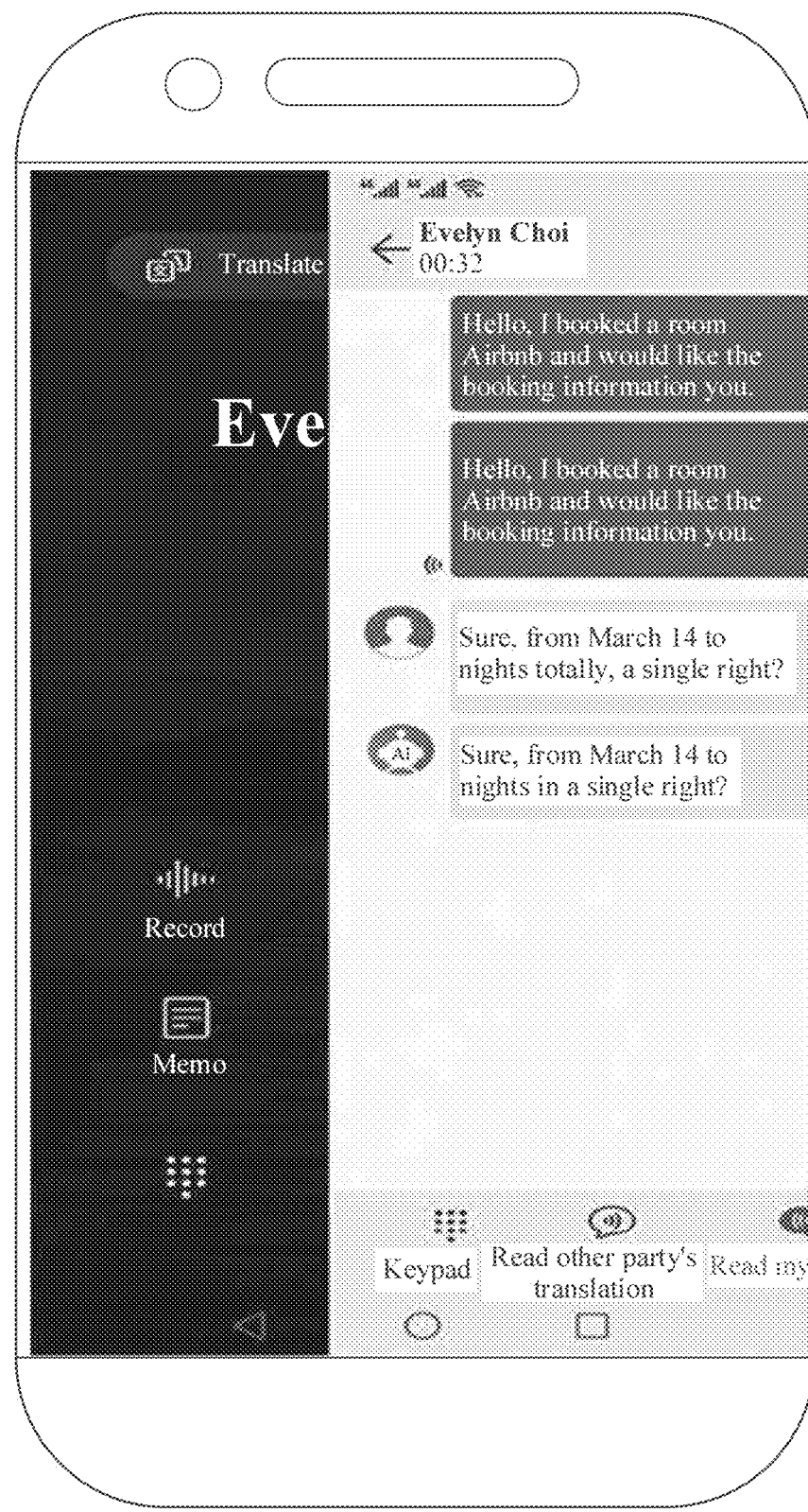
Figure 4H:
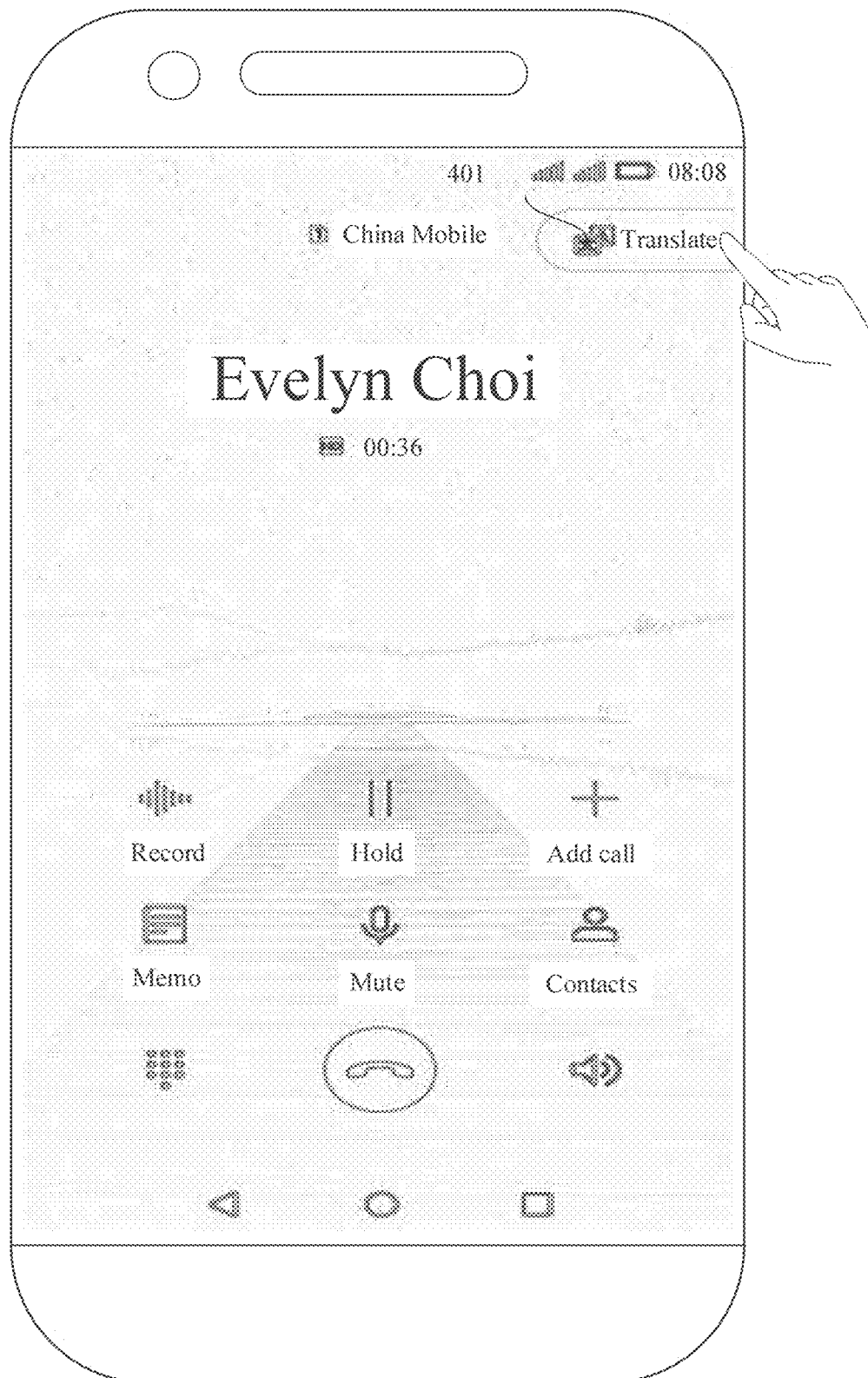

Further, the first user Wang may reply with a Chinese speech "Yes, I will check in at 6 o'clock. Thank you." The first electronic device first automatically recognizes the Chinese speech of the first user Wang as a Chinese text, and displays the Chinese text on a translation interface shown in FIG. 4d. Then, the first electronic device translates the Chinese text into an English text "Yes, I will check in at 6 o'clock, thanks.", and displays the English text in an area below the Chinese text "Yes, I will check in at 6 o'clock. Thank you." on the translation interface shown in FIG. 4d. Further, the first electronic device converts the English text into a machine speech in the English language; and after sending the Chinese speech of the sentence of the first user Wang to the second user Evelyn Choi, the first electronic device further sends the machine speech in the English language to the second user Evelyn Choi. In this way, after the other party, the second user Evelyn Choi, receives the Chinese speech replied by the first user Wang and the machine speech in the English language, the second user Evelyn Choi may understand call content of the first user Wang, and the second user Evelyn Choi replies with an English speech "Got it, You are welcome.". In this case, the first electronic device first receives the English speech of the sentence replied by the second user Evelyn Choi, and then the first electronic device first automatically recognizes the English speech of the sentence as an English text, and displays the English text on a translation interface shown in FIG. 4e. Then, the first electronic device translates the English text into a Chinese text "Got it. You are welcome.", and displays the Chinese text after the English text "Got it, You are welcome." on the translation interface shown in FIG. 4e. Further, the first electronic device converts the Chinese text into a machine speech in the Chinese language. The first user Wang may understand call content of the peer user by reading the Chinese text on the translation interface shown in FIG. 4e or by playing the machine speech in the Chinese language.

On the translation interfaces shown in FIG. 4b to FIG. 4e, the post-translation texts are displayed on the translation interfaces in a form of messages sent by an AI robot. In addition, on the translation interfaces shown in FIG. 4b to FIG. 4e, a play icon is marked next to a machine speech currently being played by the first electronic device, as shown by a control 403 in FIG. 4b.

It should be noted that, in addition to a position setting manner of the translation control 401 in FIG. 4a, there may be a plurality of position setting manners. As shown in FIG. 4f to FIG. 4i, the translation control 401 is set in a "More" menu in an upper right corner of a call interface in FIG. 4f, and the translation control 401 is set in a call control list in FIG. 4g1 and FIG. 4g2. If the call control list cannot be displayed on one screen, a navigation point may be used for flicking display. For example, a floating translation control 401 is set on a call interface in FIG. 4h. When a user flicks to the left on the translation control, a display screen may display a translation interface shown in FIG. 4i.

In addition, it should be noted that, when both the first electronic device and the second electronic device have a translation function, both the first electronic device and the second electronic device may display the translation interfaces shown in FIG. 4b to FIG. 4e. When the second electronic device does not have a translation function, the second electronic device may not display the translation interfaces shown in FIG. 4b to FIG. 4e, and a user understands conversation content only by listening to a speech received from the other party and a post-translation machine speech. Alternatively, neither the first electronic device nor the second electronic device may display the translation interfaces shown in FIG. 4b to FIG. 4e, and a user understands conversation content only by using a received speech from the other party and a post-translation machine speech.

It should be further noted that, when the electronic device has the translation function, the electronic device may be connected to a network, and obtain a post-translation text and a post-translation machine speech from a cloud server by using the network. For example, the electronic device is connected to a wireless fidelity (wireless fidelity, wifi) network, and obtains a post-translation text and a post-translation machine speech from a cloud server; or the electronic device initiates a call by using voice over long term evolution (voice over long term evolution, VOLTE), and obtains a post-translation text and a post-translation machine speech from a cloud server during the call. In addition, the translation function may be machine translation, and may also be manual online translation. In addition, the electronic device may directly obtain a post-translation text and a post-translation machine speech by using a language library stored in the electronic device without connecting to a network.

In a possible design, if the first user Wang asks a colleague nearby, a third user Zhang, to manually translate the first user Wang's call content, the first user Wang may choose to exit the translation function. In this case, when the first electronic device detects an operation performed by the first user Wang on an exit control 402 (for example, touching the control 402) shown in FIG. 4b, the first electronic device exits the translation interface, and stops translating call content of the first user and the peer user at the same time, but the call continues. For example, after the third user Zhang of the first electronic device sends a fifth speech "Thanks." in English, the first electronic device directly sends the fifth speech "Thanks." to the second electronic device. That is, during a call between two users, the translation function can be enabled or disabled at any time without interrupting the call. In this way, it is convenient for a user to enable the translation function according to an actual requirement, which is more user-friendly and personalized and improves user experience.

Figure 5:
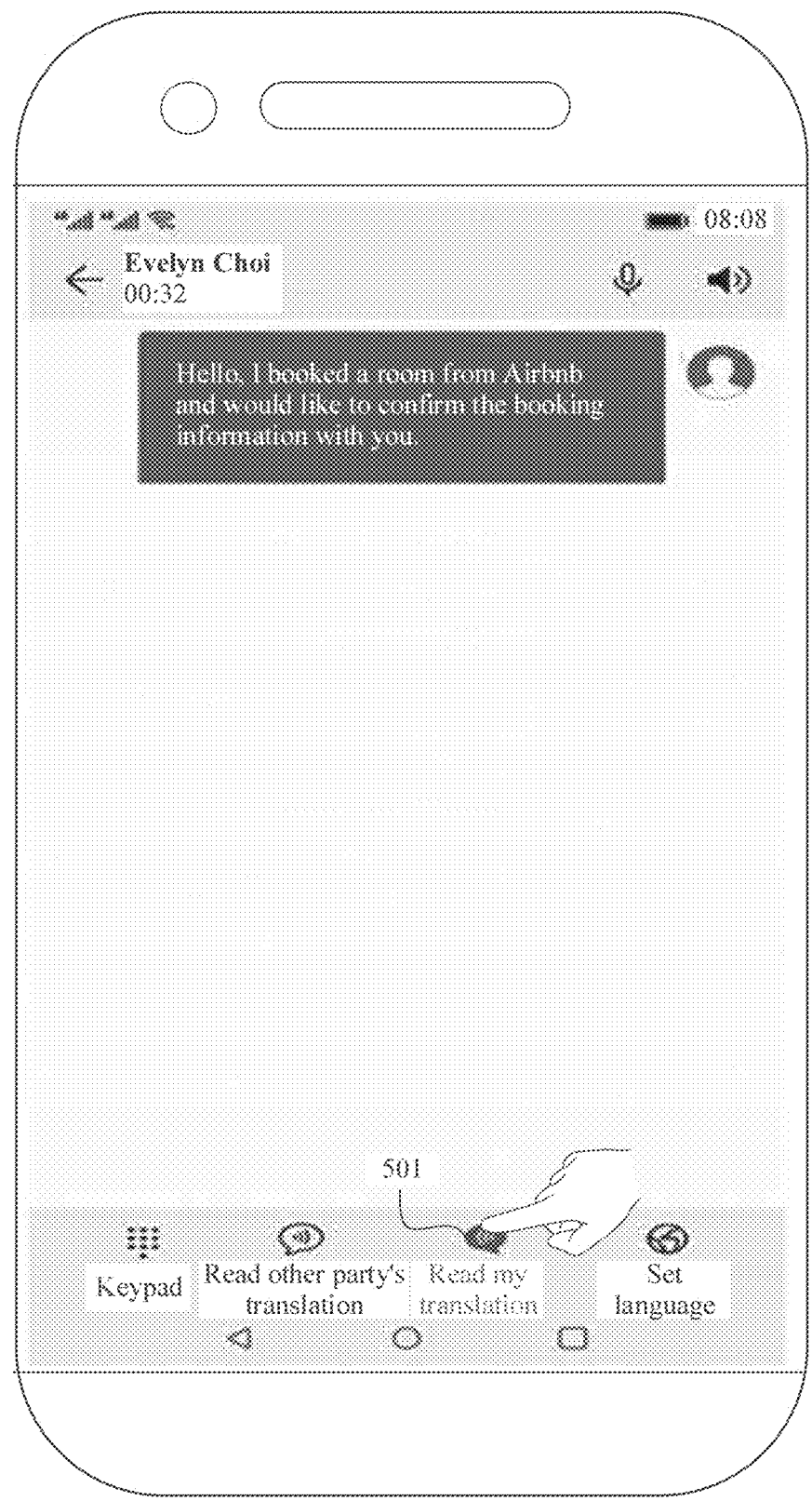
FIG. 5 is a schematic diagram of an interface according to an embodiment of this application.

In another embodiment of this application, as shown in FIG. 5, if a first user Wang has an average oral English level and can speak some simple spoken English, during a call between the first user Wang and a second user Evelyn Choi, the first user Wang may directly send an English speech during the call. In this case, this sentence does not need to be translated. Optionally, to achieve this effect, the first user Wang may manually disable a function of translating the first user Wang's own translation. For example, after the first user Wang sends a second speech in English "Hello, I booked a room from Airbnb, and would like to confirm the booking information with you.", in response to a disable operation performed by the first user Wang on a function control 501 of "Read my translation" (for example, touching the control 501) on a translation interface shown in FIG. 5, a first electronic device displays the translation interface shown in FIG. 5. Only an English text "Hello, I booked a room from Airbnb, and would like to confirm the booking information with you." is displayed on the translation interface. In other words, a user may choose, according to a requirement, whether to translate the user's call content, so as to reduce an invalid translation and improve call fluency. Optionally, even if a translation switch is turned on, when the first user Wang directly communicates with the other party in English, and the first electronic device detects that a language used by a local user is English, the first electronic device only displays a corresponding English text that is recognized, and does not translate the recognized English text.

Figure 6:
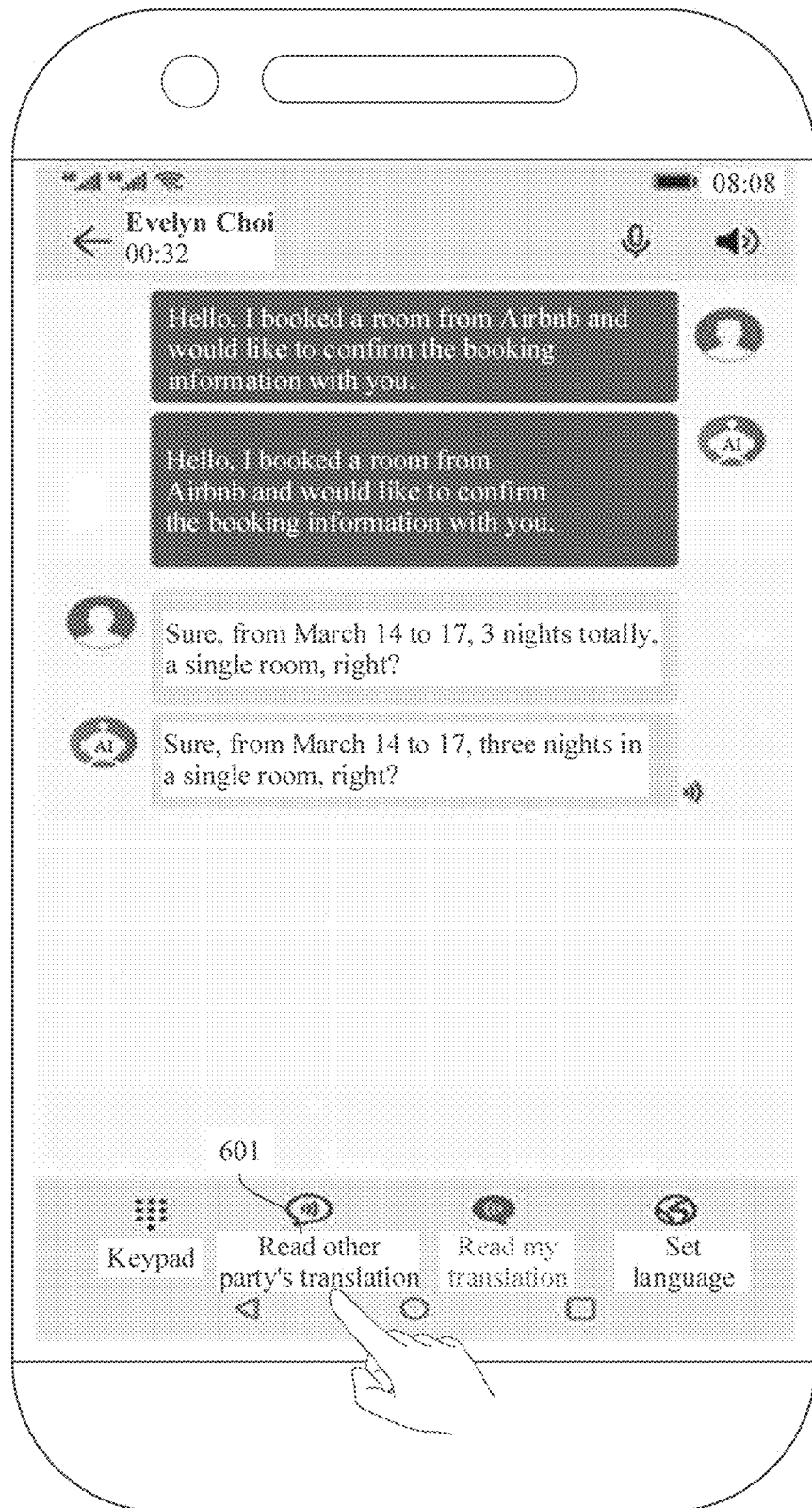
FIG. 6 is a schematic diagram of an interface according to an embodiment of this application.

In another embodiment of this application, as shown in FIG. 6, when a first user Wang is driving or there is another person around who needs to listen in, the first user Wang may choose to turn on a function switch of "Read other party's translation". For example, a first electronic device responds to a turn-on operation performed by the first user Wang on a function control 601 of "Read my translation" (for example, touching the control 601) on a translation interface shown in FIG. 6; and after a second user Evelyn Choi sends an English speech "Sure, from Match 14 to 17, 3 nights totally, a single room, right?", the first electronic device may play a Chinese speech "Sure, from March 14 to 17, three nights in a single room, right?" that corresponds to the English speech sent by the second user Evelyn Choi. In other words, a user may choose, according to a requirement, to broadcast post-translation machine speech content of the other party, which is more applicable to different service scenarios, and improves user experience.

Figure 7A:
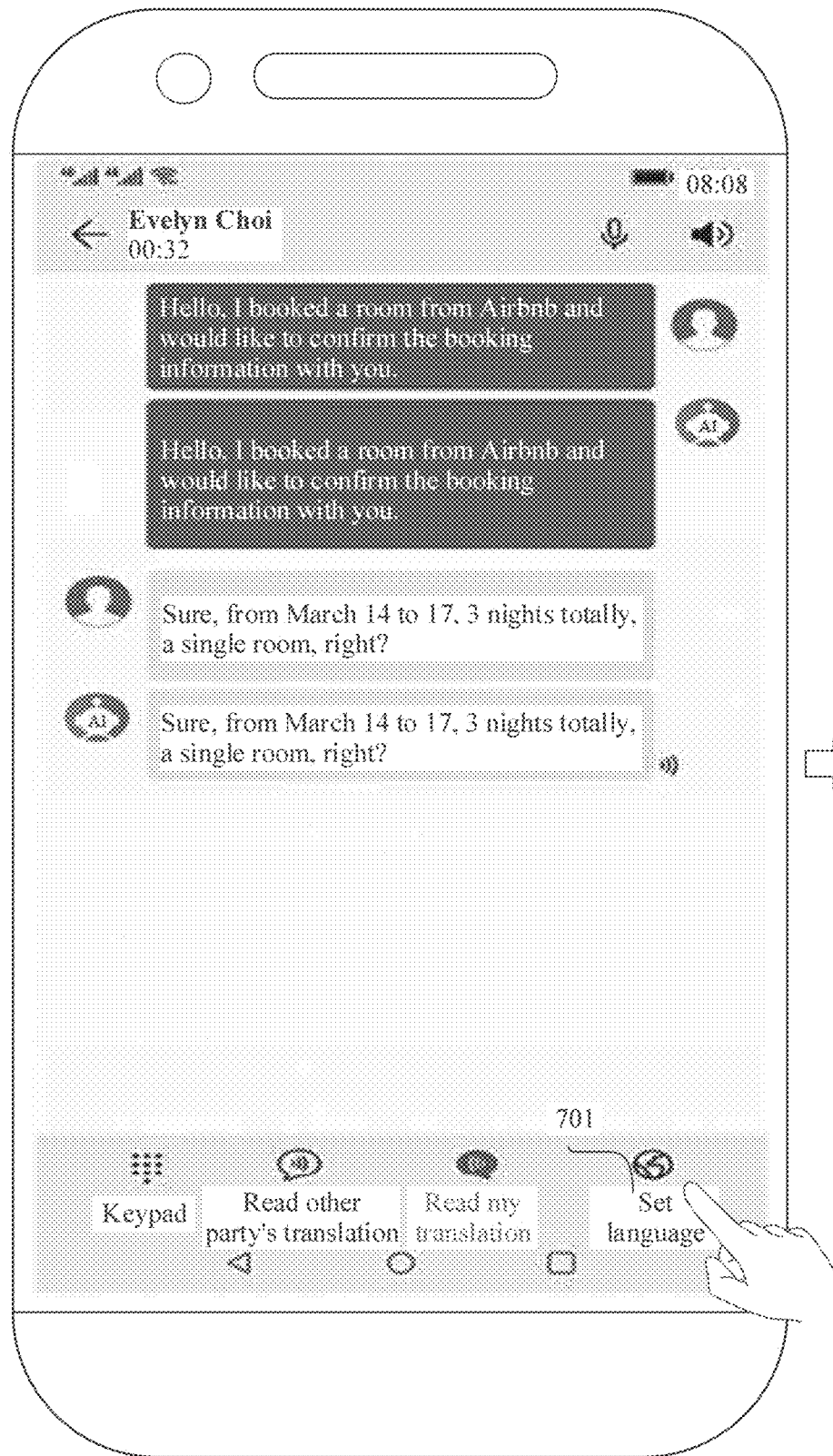
FIG. 7*a* to FIG. 7*d* are a schematic diagram of a group of interfaces according to an embodiment of this application.
Figure 7B:
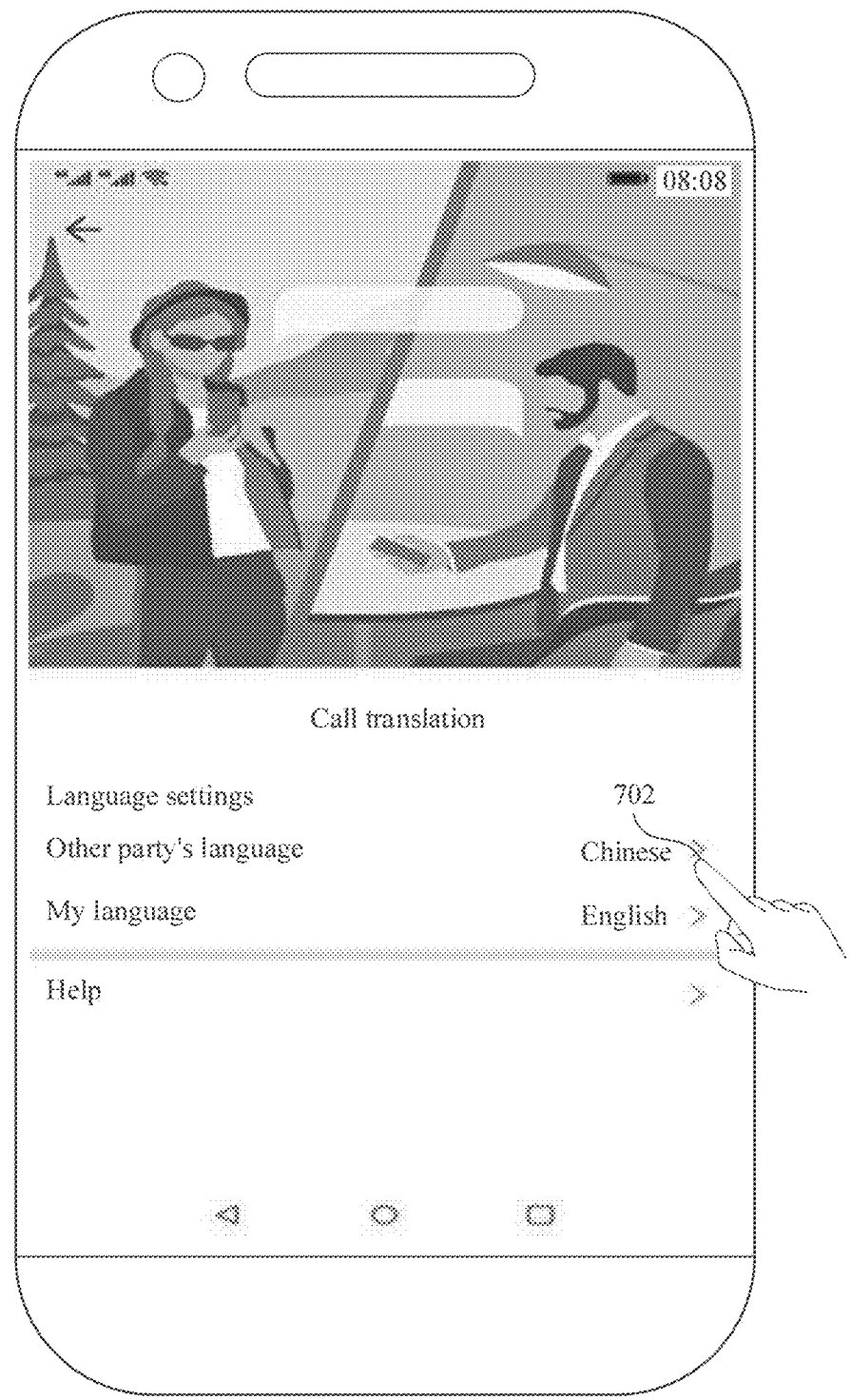
Figure 7C:
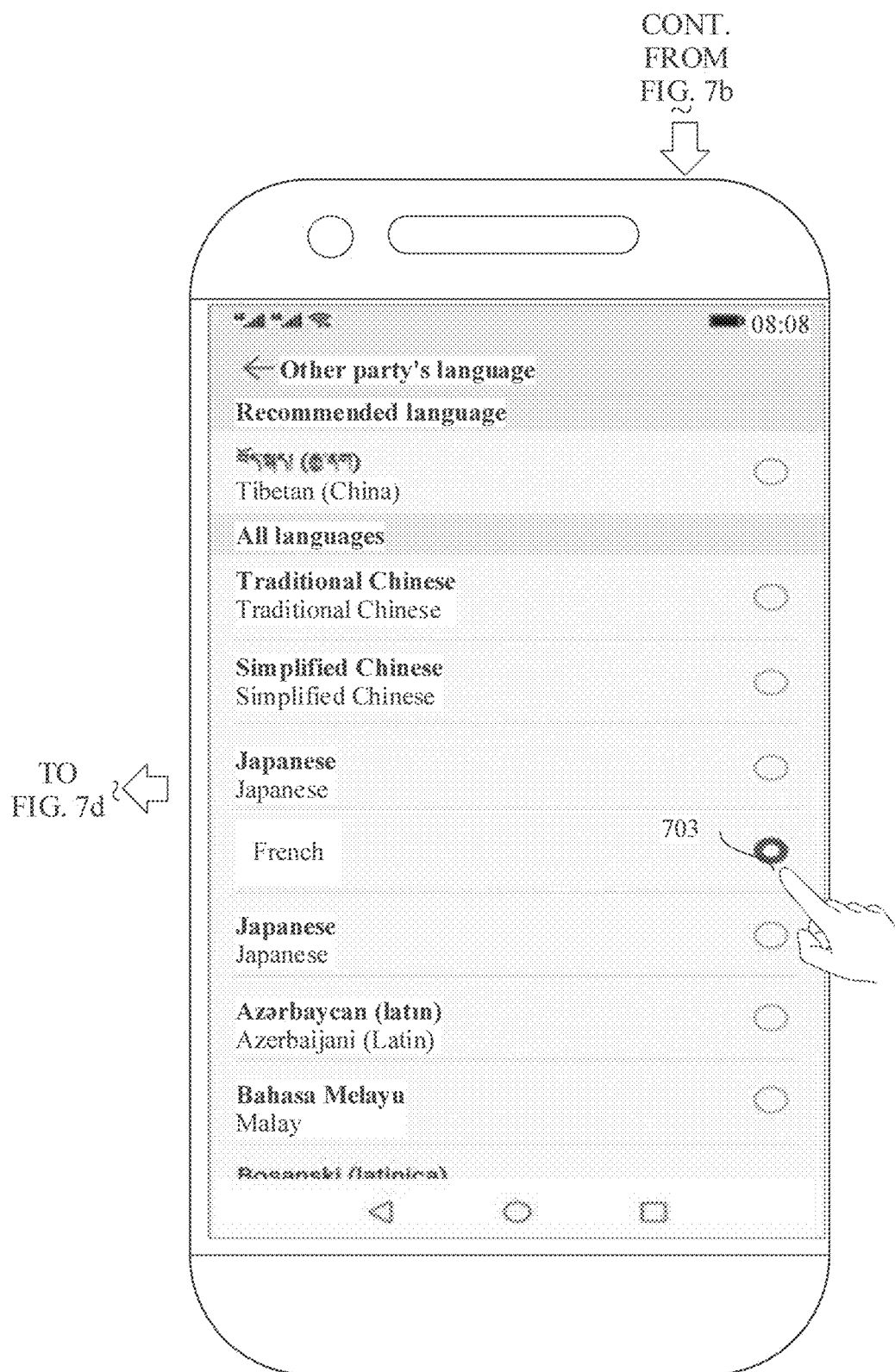
Figure 7D:
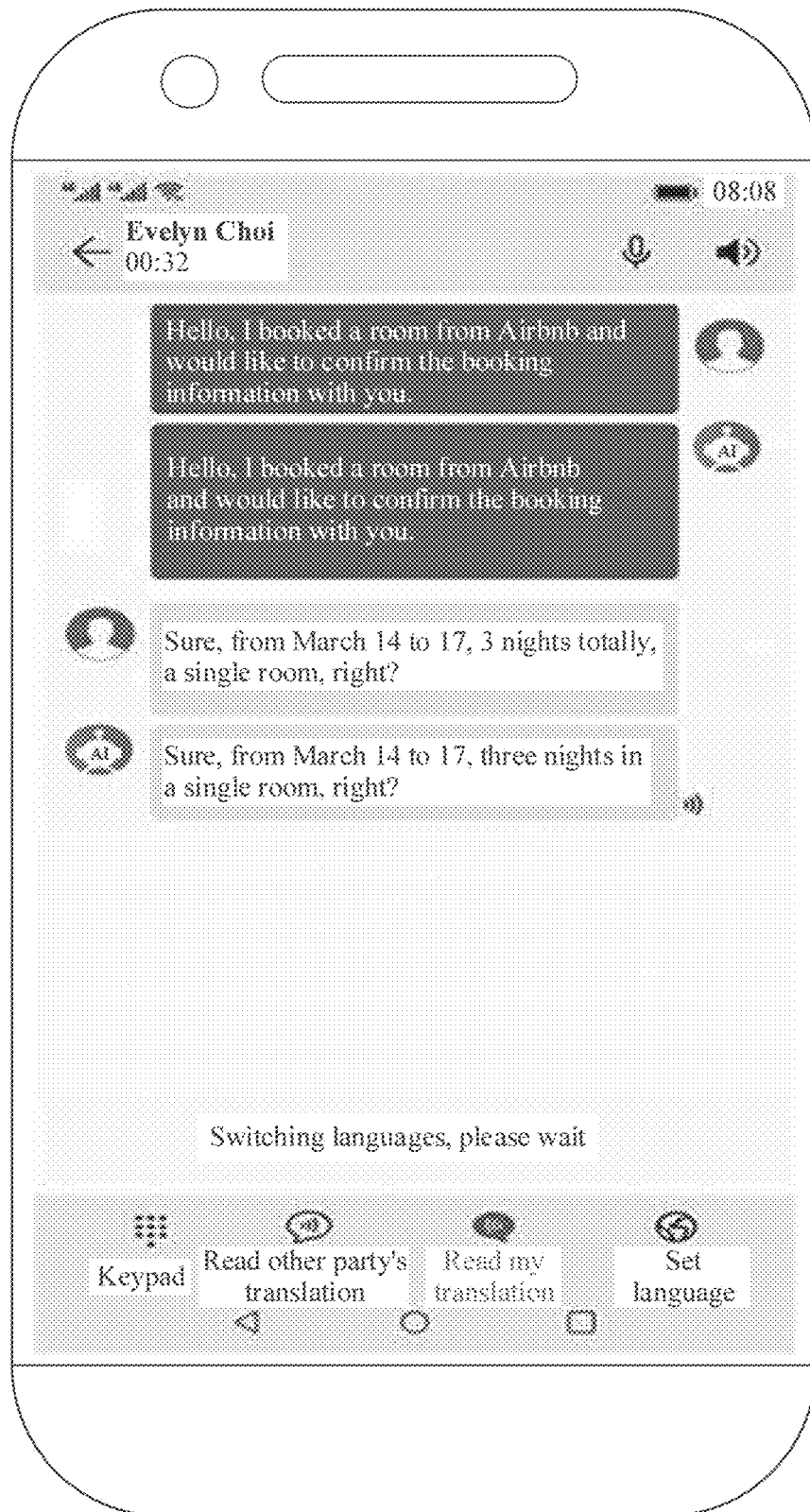

In another embodiment of this application, during a call, a user may choose, according to an actual requirement, to change a language type after translation, and the call is not interrupted, that is, the call continues. As shown in FIG. 7a to FIG. 7d, when a first electronic device detects an operation performed by a first user Wang on a control 701 of Set language (for example, touching the control 701) shown in FIG. 7a, a language settings interface shown in FIG. 7b is displayed, where the language settings interface includes language types of two parties in a call. For example, the language settings interface includes Other party's language and My language, where My language may be obtained in advance by using a system default language. For example, a system default language of the first electronic device is Chinese. Therefore, as shown in FIG. 7b, My language is Chinese, and Other party's language is set to English by default. If a user Wang learns, during a call, that a native language of the other party is French. the user Wang may immediately change Other party's language to French. That is, when detecting an operation performed by the first user Wang on a control 702 of Other party's language (for example, touching the control 702) on the translation interface shown in FIG. 7b, the first electronic device displays a translation interface shown in FIG. 7c. The translation interface includes a plurality of language options. When detecting an operation performed by the user on a control 703 of French (for example, touching the control 703), the first electronic device returns to the translation interface, that is, a translation interface shown in FIG. 7d. The translation interface further includes prompt information "Switching languages, please wait". It can be learned that, in the foregoing process, a user can switch a language type during a call, so that the user can communicate smoothly, thereby improving communication efficiency.

In another embodiment of this application, in one manner, before a user establishes a call, the user may access a language settings interface of a phone application in advance, that is, the language settings interface shown in FIG. 7b, and the user proactively sets Other party's language and My language. Generally, an electronic device sets, by default, My language to a system default language, and Other party's language to Chinese. The user may modify the default settings according to an actual requirement. In another manner, when a user establishes a call, an electronic device may automatically set Other party's language based on an obtained international area code of a phone number dialed by the user or an obtained international area code of an incoming call number. That is, the electronic device automatically sets a target language to an official language of a country corresponding to the international area code. For example, an international area code of a call made by a first user Wang is 0033, and a first electronic device obtains the international area code 0033 and determines that the international area code belongs to France. Although there is a plurality of languages in France, an official language is French. Therefore, the first electronic device automatically changes an official language of Other party's language to French. For another example, an international area code of an incoming call received by a second user Evelyn Choi is 0086, and a second electronic device obtains the international area code 0086 and determines that the international area code belongs to China. Therefore, the second electronic device automatically changes Other party's language to simplified Chinese.

Figure 8:
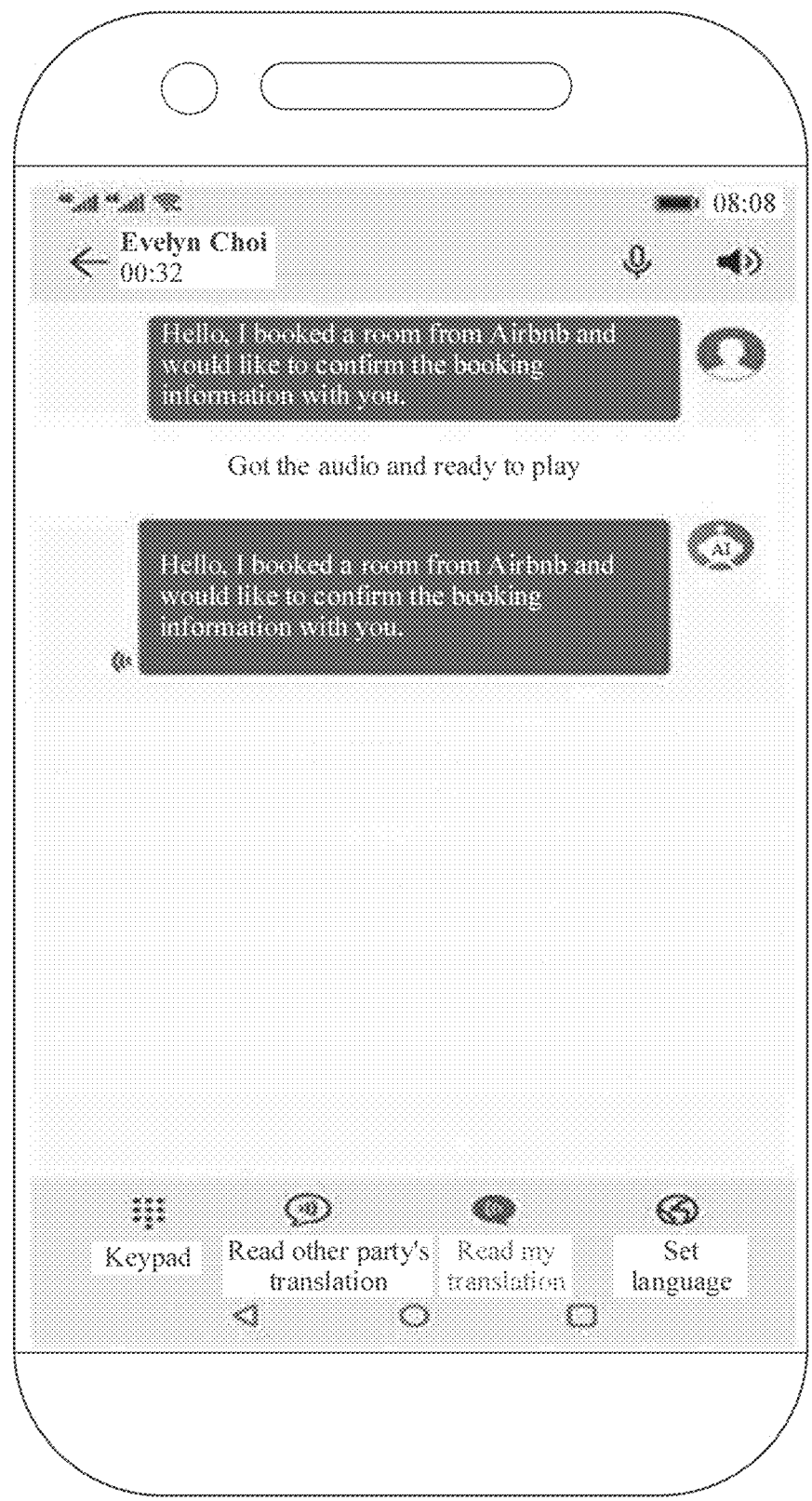
FIG. 8 is a schematic diagram of an interface according to an embodiment of this application.

In another embodiment of this application, a specific time delay may be caused during translation, and a first electronic device or a second electronic device first converts a speech of a user into a text, and then translates the text into a machine speech. Therefore, it may be possible that the original text and a post-translation text are quickly displayed on a translation interface, but the other party has not received audio data, that is, the other party has not received the post-translation machine speech. Therefore, a manner of controlling a speech sequence provided in this embodiment of this application is as follows: The first electronic device or the second electronic device first displays a text corresponding to a speech sent by a user of the first electronic device or the second electronic device; and after the first electronic device or the second electronic device obtains, by translation, a machine speech corresponding to the speech sent by the user of the first electronic device or the second electronic device, a post-translation text corresponding to the speech sent by the user of the first electronic device or the second electronic device is displayed and a speaker plays the machine speech at the same time. As shown in FIG. 8, a translation interface first displays "Hello, I booked a room from Airbnb, and would like to confirm the booking information with you.". After an electronic device obtains a post-translation machine speech, the electronic device displays "Hello, I booked a room from Airbnb, and would like to confirm the booking information with you.", and at the same time, a speaker broadcasts the machine speech "Hello, I booked a room from Airbnb, and would like to confirm the booking information with you.". It should be noted that the translation interface may further display a prompt "Got the audio and ready to play". In this way, not only speech sequence control can be implemented, but it is also convenient for a user to learn of a current device status.

Figure 9:
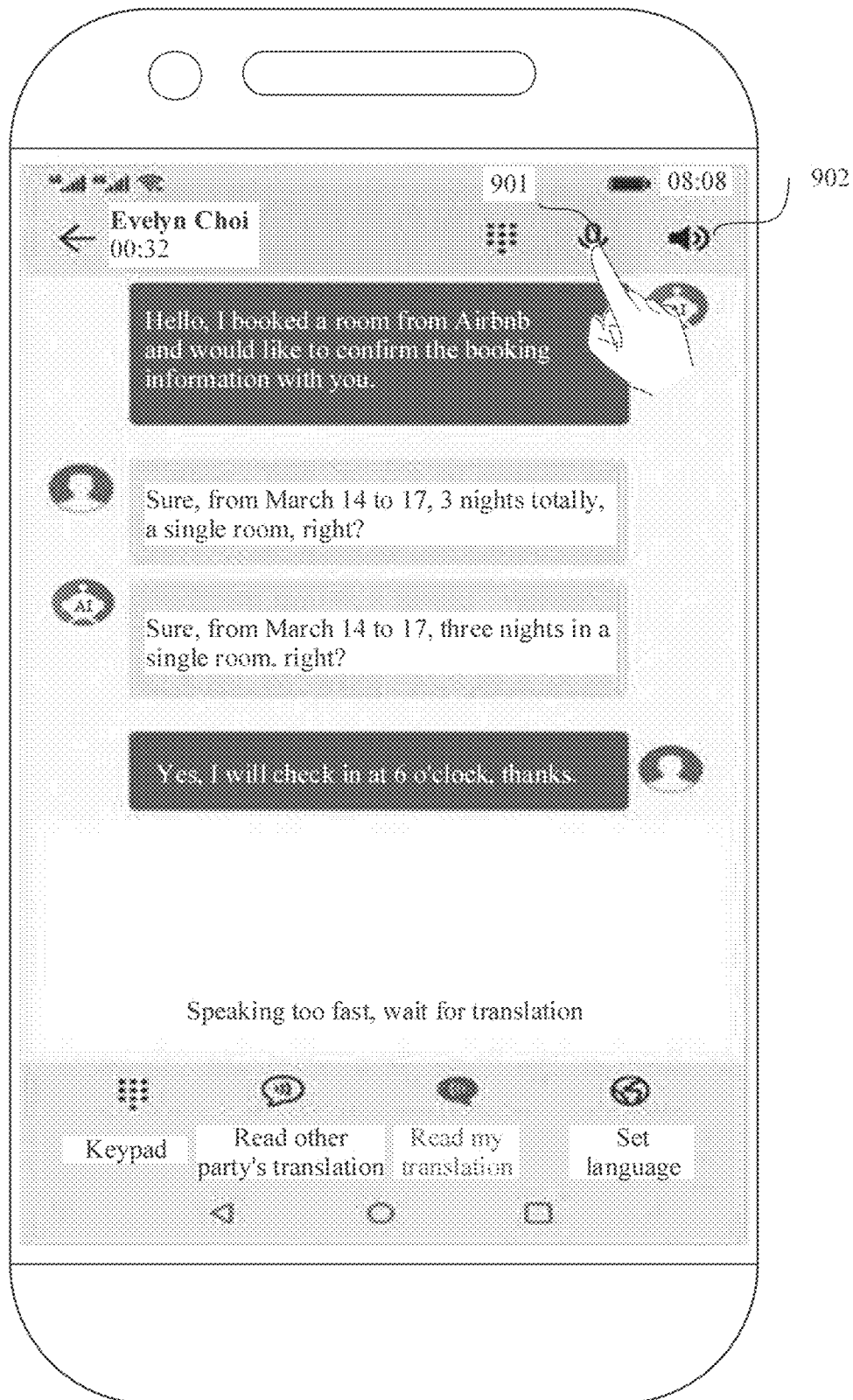
FIG. 9 is a schematic diagram of an interface according to an embodiment of this application.

In another embodiment of this application, when a user speaks excessively fast, or an interval between consecutive speeches sent by the user is excessively short, an electronic device may display prompt information on a translation interface, to remind the user to slow down a speaking rate, so as to avoid overlapping between a machine speech and the user's speech. For example, as shown in FIG. 9, a first electronic device plays, by using a speaker of the first electronic device, "Sure, from March 14 to 17, three nights in a single room, right?". Because a first user Wang has read a post-translation text on a translation interface before the speaker completes playing a machine speech, the first user Wang may send a fourth speech in Chinese "Yes, I will check in at 6 o'clock. Thank you.". In this case, the machine speech and the speech of the first user Wang may overlap. Therefore, in response to the fourth speech, the first electronic device displays prompt information, where the prompt information is used to instruct the first user to send a speech after the machine speech in a first language is played. As shown in FIG. 9, a translation interface includes prompt information "Speaking too fast, wait for translation". Certainly, the prompt information may not be displayed on the translation interface, and may be displayed on a display screen by using a separate message box.

In addition, it should be noted that a mute control 901 and a hands-free control 902 are further set on the translation interface shown in FIG. 9. When the electronic device detects an operation performed by a user on the mute control 901 (for example, touching the control 901), the electronic device no longer broadcasts speech content. When the electronic device detects an operation performed by a user on the hands-free control 902 (for example, touching the control 902), the electronic device no longer plays speech content. In this way, a translation function may be more user-friendly, thereby improving user experience.

Figure 10:
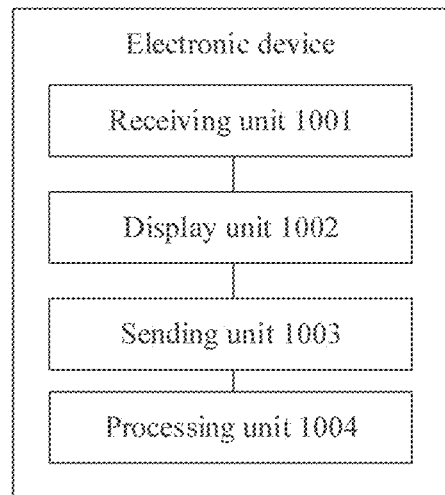
FIG. 10 is a schematic structural diagram of an electronic device according to an embodiment of this application.

In some embodiments of this application, an embodiment of this application discloses an electronic device. As shown in FIG. 10, the electronic device is configured to implement the method recorded in the foregoing method embodiments, and the electronic device includes a receiving unit 1001, a display unit 1002, a sending unit 1003, and a processing unit 1004. The receiving unit 1001 is configured to support the electronic device in performing an operation of receiving a user's speech and a machine speech in the foregoing method. The display unit 1002 is configured to support the electronic device in performing an operation of displaying a call interface, a translation interface, and a call setting interface in the foregoing method. The sending unit 1003 is configured to support the electronic device in performing an operation of sending a user's speech and a machine speech in the foregoing method. The processing unit 1004 is configured to support the electronic device in converting a speech into a text and translating the speech and the text into a speech and a text that are in a target language. All related content in the foregoing method embodiments may be referred to in a function description of a corresponding unit module, and details are not described herein again.

Figure 11:
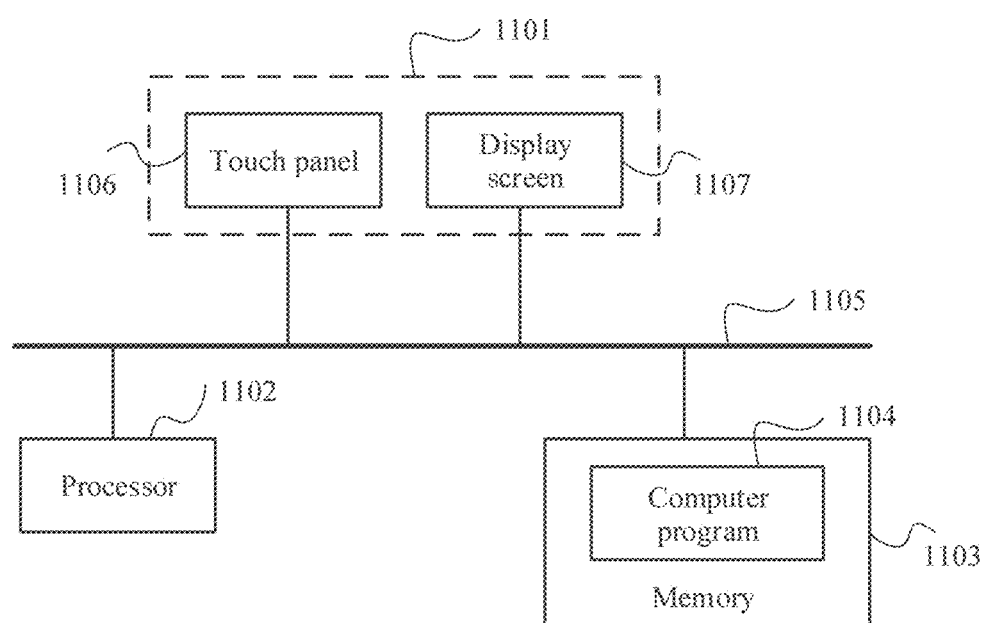
FIG. 11 is a schematic structural diagram of another electronic device according to an embodiment of this application.

In some other embodiments of this application, an embodiment of this application discloses an electronic device. As shown in FIG. 11, the electronic device may include a touchscreen 1101, one or more processors 1102, a memory 1103, one or more application programs (not shown), and one or more computer programs 1104, where the touchscreen 1101 includes a touch panel 1106 and a display screen 1107. The foregoing devices may be connected by using one or more communications buses 1105. The one or more computer programs 1104 are stored in the memory 1103 and are configured to be executed by the one or more processors 1102. The one or more computer programs 1104 include an instruction, and the instruction may be used to perform each step in the corresponding embodiments in FIG. 4a to FIG. 9.

An embodiment of this application further provides a computer storage medium. The computer storage medium stores a computer instruction. When the computer instruction runs on an electronic device, the electronic device is enabled to perform the foregoing related method steps to implement the photo sharing method in the foregoing embodiments.

An embodiment of this application further provides a computer program product. When the computer program product runs on a computer, the computer is enabled to perform the foregoing related steps to implement the translation method in the foregoing embodiments.

In addition, an embodiment of this application further provides an apparatus. The apparatus may be specifically a chip, a component, or a module, and the apparatus may include a processor and a memory that are connected to each other. The memory is configured to store a computer executable instruction. When the apparatus runs, the processor may execute the computer executable instruction stored in the memory, so that the chip performs the translation method in the foregoing method embodiments.

The electronic device, the computer storage medium, the computer program product, or the chip provided in the embodiments of this application is configured to perform the corresponding method provided above. Therefore, for beneficial effects that can be achieved by the electronic device, the computer storage medium, the computer program product, or the chip, refer to the beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A translation method, implemented by a first electronic device, wherein the translation method comprises:
  establishing a call connection to a second electronic device;
  displaying a call interface of the first electronic device during the call connection;
  receiving a first operation from a user;
  switching, in response to the first operation, from displaying the call interface to displaying a translation interface;
  receiving first speech from the user in a first language;
  sending the first speech to the second electronic device;
  displaying, by the translation interface and in response to the first speech, a first text and a second text, wherein the first text is based on the first speech, and wherein the second text is in a target language;
  sending a first machine speech in the target language to the second electronic device when the translation interface displays the second text, wherein the first machine speech is obtained by translating the first speech into the target language;

receiving, on the translation interface, a language setting operation from the user;

switching, in response to the language setting operation, from displaying the translation interface to displaying a language settings interface, wherein the language settings interface comprises a setting control of a second language;

receiving, on the setting control of the second language, a confirmation operation from the user;

setting, in response to the confirmation operation, the target language to the second language;

receiving, on the call interface, an on-hook operation from the user; and terminating the call connection in response to the on-hook operation.

2. The translation method of claim 1, wherein after establishing the call connection to the second electronic device and before receiving the first speech, the translation method further comprises:

obtaining an international area code from a phone number dialed by the user; and setting, based on the international area code, the target language to an official language of a country corresponding to the international area code.

3. The translation method of claim 1, wherein after receiving the first speech and before displaying the first text and the second text, the translation method further comprises:

obtaining the first text by recognizing the first speech;
translating the first text; and
converting the second text into the first machine speech.

4. The translation method of claim 1, further comprising:
receiving second speech of the user in the target language;
sending the second speech to the second electronic device;
recognizing the second speech to obtain a third text in the target language; and
when a language corresponding to the second speech is the target language, skipping, in response to the second speech, translating the second speech and displaying the translation interface, wherein the translation interface further comprises the third text.

5. The translation method of claim 1, wherein after sending the first machine speech to the second electronic device and before receiving the on-hook operation, the translation method further comprises:

receiving third speech that is in the target language and that is from the second electronic device;

recognizing the third speech to obtain a fourth text in the target language;

translating the third speech into the target language to obtain a fifth text in the first language;

displaying, in response to the third speech, the translation interface, wherein the translation interface further comprises the fourth text and the fifth text;

translating the third speech into the target language to obtain a second machine speech in the first language; and displaying the fifth text on the translation interface when the second machine speech is in the first language and when the second machine speech is from the second electronic device.

6. The translation method of claim 5, further comprising playing, using an earpiece of the first electronic device, the third speech, wherein after receiving the second machine speech and before receiving the on-hook operation, the translation method further comprises playing, using a speaker of the first electronic device, the second machine speech.

7. The translation method of claim 6, wherein before receiving the on-hook operation, the translation method further comprises:

receiving, on a mute control on the translation interface, a close operation from the user; and stopping playing, in response to the close operation, the second machine speech.

8. The translation method of claim 6, wherein when playing the second machine speech, the translation method further comprises:

receiving a fourth speech of the user in the first language; and displaying, in response to the fourth speech, prompt information, wherein the prompt information instructs the user to send a speech after the second machine speech is played.

9. The translation method of claim 1, wherein before receiving the on-hook operation, the method further comprises:

receiving, on the translation interface, an exit operation from the user;

switching, in response to the exit operation, from displaying the translation interface to displaying the call interface;

receiving a fifth speech of the user in the first language; and sending the fifth speech to the second electronic device.

10. A first electronic device, comprising:
a wireless communications module;
a touch panel;
a display screen;
a processor coupled to the wireless communications module, the touch panel, and the display screen; and
a memory coupled to the processor and configured to store instructions that, when executed by the processor, cause the first electronic device to be configured to:
establish a call connection to a second electronic device using the wireless communications module
display, using the display screen, a call interface of the first electronic device during the call connection;
receive, using the microphone, first speech from a user in a first language;
receive, using the touch panel, a first operation from the user;
switch, in response to the first operation, from displaying the call interface to displaying a translation interface;
receive the first speech from the user in the first language;
send the first speech to the second electronic devices;
display, using the display screen and in response to the first speech, a first text and a second text, wherein the first text is based on the first speech, and wherein the second text is in a target language;
send a first machine speech in the target language to the second electronic device when displaying the second text;
receive, using the touch panel, a language setting operation from the user on the translation interface;
switch, in response to the language setting operation, from displaying the translation interface to displaying, using the display screen, a language settings interface, wherein the language settings interface comprises a setting control of a second language;

receive, using the touch panel and on the setting control of the second language, a confirmation operation from the user;
set, in response to the confirmation operation, the target language to the second language;
receive, using the touch panel and on the call interface, an on-hook operation from the user; and
terminate the call connection in response to the on-hook operation.

11. The first electronic device of claim 10, wherein after the instructions cause the first electronic device to establish the call connection and before the instructions cause the first electronic device to receive the first speech, the instructions further cause the first electronic device to be configured to:
obtain an international area code from the user based on a phone number; and
set, based on the international area code, the target language to an official language of a country corresponding to the international area code.

12. The first electronic device of claim 10, wherein after the instructions cause the first electronic device to receive the first speech and before the instructions cause the first electronic device to display the first text and the second text, the instructions further cause the first electronic device to be configured to:
obtain the first text by recognizing the first speech;
translate the first text; and
convert the second text into the first machine speech.

13. The first electronic device of claim 10, wherein the instructions further cause the first electronic device to be configured to:
receive second speech of the user;
send, using the wireless communications module, the second speech to the second electronic device;
recognize the second speech to obtain a third text in the target language; and
when a language corresponding to the second speech is the target language, skip translating, in response to the second speech, the second speech and display the translation interface, wherein the translation interface further comprises the third text.

14. The first electronic device of claim 10, wherein the instructions further cause the first electronic device to be configured to:
receive third speech that is from the second electronic device;
recognize the third speech to obtain a fourth text in the target language;
translate the third speech into the target language to obtain a fifth text in the first language;
display, using the display screen and in response to the third speech, the translation interface, wherein the translation interface further comprises the fourth text and the fifth text;
translate the third speech into the target language to obtain a second machine speech in the first language; and
display the fifth text on the translation interface when the second machine speech is in the first language and when the second machine speech is from the second electronic device.

15. The first electronic device of claim 14, further comprising an earpiece coupled to the processor, and wherein the instructions further cause the first electronic device to be configured to:
play, using the earpiece, the third speech; and
play the second machine speech.

16. The first electronic device of claim 15, wherein before the instructions cause the first electronic device to receive the on-hook operation, the instructions further cause the first electronic device to be configured to:
receive a close operation from the user; and
stop playing, in response to the close operation, the second machine speech.

17. The first electronic device of claim 15, wherein the instructions further cause the first electronic device to be configured to:
receive a fourth speech of the user in the first language when the second machine speech is played; and
display, using the display screen and in response to the fourth speech, prompt information, wherein the prompt information instructs the user to send a fifth speech after the second machine speech is played.

18. The first electronic device of claim 10, wherein before the instructions cause the first electronic device to receive the on-hook operation, the instructions further cause the first electronic device to be configured to:
receive, using the touch panel, an exit operation from the user;
switch, in response to the exit operation, from displaying the translation interface to displaying the call interface;
receive a fifth speech of the user in the first language; and
send the fifth speech to the second electronic device.

19. A first electronic device comprising a non-transitory computer-readable medium comprising a computer program that, when executed by the first electronic device, causes the first electronic device to:
establish a call connection to a second electronic device;
display a call interface of the first electronic device during the call connection;
receive a first operation from a user;
switch, in response to the first operation, from displaying the call interface to displaying a translation interface;
receive first speech from the user in a first language;
send the first speech to the second electronic device;
obtain a first text by recognizing the first speech;
obtain a second text by translating the first speech into a target language;
display, by the translation interface and in response to the first speech, the first text and the second text;
send a first machine speech in the target language to the second electronic device when the translation interface displays the second text;
receive a language setting operation from the user via the translation interface;
switch, in response to the language setting operation, from displaying the translation interface to displaying a language settings interface, wherein the language settings interface comprises a setting control of a second language;
receive, on the setting control of the second language, a confirmation operation from the user;
set, in response to the confirmation operation, the target language to the second language;
receive, on the call interface, an on-hook operation from the user; and
terminate the call connection in response to the on-hook operation.

20. The first electronic device of claim 19, wherein after the computer program causes the first electronic device to establish the call connection to the second electronic device and before the computer program causes the first electronic device to receive the first speech, the computer program causes the first electronic device to:

obtain an international area code from the user based on a phone number; and set, based on the international area code, the target language to an official language of a country corresponding to the international area code.

\* \* \* \* \*